(12) United States Patent
Tian

(10) Patent No.: US 10,683,098 B2
(45) Date of Patent: Jun. 16, 2020

(54) DRIVING DEVICE ASSEMBLY WITH MULTIPLE DRIVE DEVICES AND APPLICATION THEREOF

(71) Applicant: Yuefeng Tian, Tangshan (CN)

(72) Inventor: Yuefeng Tian, Tangshan (CN)

(73) Assignee: Yuefeng Tian, Tangshan (CN)

( * ) Notice: Subject to any disclaimer, the term of this patent is extended or adjusted under 35 U.S.C. 154(b) by 0 days.

(21) Appl. No.: 15/740,331

(22) PCT Filed: Jun. 16, 2016

(86) PCT No.: PCT/CN2016/000308
§ 371 (c)(1),
(2) Date: Dec. 27, 2017

(87) PCT Pub. No.: WO2017/000528
PCT Pub. Date: Jan. 5, 2017

(65) Prior Publication Data
US 2018/0312267 A1    Nov. 1, 2018

(30) Foreign Application Priority Data

Jun. 29, 2015 (CN) .......................... 2015 1 0363812
Jun. 29, 2015 (CN) .......................... 2015 1 0363831
(Continued)

(51) Int. Cl.
*B64D 27/26* (2006.01)
*B64D 27/02* (2006.01)
*B64D 41/00* (2006.01)

(52) U.S. Cl.
CPC ............. *B64D 27/26* (2013.01); *B64D 27/02* (2013.01); *B64D 41/00* (2013.01); *B64D 2027/262* (2013.01); *B64D 2041/002* (2013.01)

(58) Field of Classification Search
CPC . B64C 2027/8227; B64C 11/46; B64C 27/20; B64C 27/08; B64C 27/12;
(Continued)

(56) References Cited

U.S. PATENT DOCUMENTS

| 5,975,464 A | 11/1999 | Rutan |
| 6,845,941 B2 | 1/2005 | Pica |

(Continued)

FOREIGN PATENT DOCUMENTS

| CN | 2759940 Y | 2/2006 |
| CN | 101314409 A | 12/2008 |

(Continued)

OTHER PUBLICATIONS

International Search Report and WO dated Sep. 1, 2016 in application No. PCT/CN2016/000308.
(Continued)

*Primary Examiner* — Philip J Bonzell
*Assistant Examiner* — Tye William Abell
(74) *Attorney, Agent, or Firm* — Maschoff Brennan

(57) ABSTRACT

The present invention relates to a drive device assembly having a plurality of drive devices and an aircraft for which drive devices and loads can be increased unlimitedly. The drive devices are arranged in a triangle so as to form a triangular drive device module. In a preferred assembling method, the spatial distances between adjacent drive devices are equal; a drive device module arranged in a triangle is taken as a basis, and is mapped and arranged and assembled towards the spatial direction so as to form a drive device assembly constituted by the multiple drive devices. The present application improves the aircraft, especially in terms of the traditional structure layout of the aircraft driven by multiple drive devices, such that the drive devices in the
(Continued)

drive system can be increased unlimitedly, thus improving the flight performance and loading capacity of the aircraft.

8 Claims, 22 Drawing Sheets

(30) Foreign Application Priority Data

| Jun. 29, 2015 | (CN) | .......................... 2015 1 0363832 |
| Jul. 22, 2015 | (CN) | .......................... 2015 1 0432369 |
| Aug. 21, 2015 | (CN) | .......................... 2015 1 0518183 |

(58) Field of Classification Search
  CPC ........ B64C 2201/024; B64C 2201/027; B64C 2201/108
  See application file for complete search history.

(56) References Cited

U.S. PATENT DOCUMENTS

| 7,143,973 | B2 | 12/2006 | Ballew | |
| 2005/0098682 | A1 | 5/2005 | Pai | |
| 2006/0266881 | A1* | 11/2006 | Hughey | ................. B64C 27/08 244/17.23 |
| 2009/0008499 | A1 | 1/2009 | Shaw | |
| 2012/0158215 | A1* | 6/2012 | Sun | ......................... B64C 27/20 701/3 |
| 2014/0374532 | A1* | 12/2014 | Duffy | ..................... B64C 37/02 244/2 |
| 2015/0012154 | A1* | 1/2015 | Senkel | .................. B64D 17/80 701/4 |
| 2015/0298788 | A1* | 10/2015 | Wang | ................... B64C 39/028 701/3 |
| 2016/0311526 | A1* | 10/2016 | Geise | ..................... B64C 27/08 |

FOREIGN PATENT DOCUMENTS

| CN | 101421157 A | 4/2009 |
| CN | 101758925 A | 6/2010 |
| CN | 101992854 A | 3/2011 |
| CN | 102092473 A | 6/2011 |
| CN | 103646424 A | 3/2014 |
| CN | 203876983 U | 10/2014 |
| CN | 104192305 A | 12/2014 |
| CN | 104386248 A | 3/2015 |
| CN | 204223179 U | 3/2015 |
| CN | 204383743 U | 6/2015 |
| CN | 104787332 A | 7/2015 |
| CN | 104925263 A | 9/2015 |
| CN | 104960665 A | 10/2015 |
| CN | 104975942 A | 10/2015 |
| CN | 105129087 A | 12/2015 |
| CN | 205034335 U | 2/2016 |
| CN | 205034348 U | 2/2016 |
| CN | 205221111 U | 5/2016 |
| DE | 102005010336 A1 | 5/2006 |
| EP | 0023843 B1 | 10/1984 |
| WO | 2011002331 A1 | 6/2011 |

OTHER PUBLICATIONS

Office Action received in Chinese Patent Application No. 201510363831.X, dated Mar. 23, 2018.
Office Action received in Chinese Patent Application No. 201510363831.X, dated Jul. 10, 2018.
1st Office Action received in Chinese Patent Application No. 2015-10363831, dated Jul. 4, 2016.
2nd Office Action received in Chinese Patent Application No. 2015-10363831, dated Oct. 28, 2016.
3rd Office Action received in Chinese Patent Application No. 2015-10363831, dated Mar. 31, 2017.
Rejection received in Chinese Patent Application No. 2015-10363831, dated Oct. 9, 2017.
1st Office Action received in Chinese Patent Application No. 2015-10363832, dated Jan. 17, 2017.
2nd Office Action received in Chinese Patent Application No. 2015-10363832, dated May 25, 2017.
Rejection received in Chinese Patent Application No. 2015-10363832, dated Jan. 5, 2018.
1st Office Action received in Chinese Patent Application No. 2015-10432369, dated Jan. 2, 2016.
Application granted in Chinese Patent Application No. 2015-10432369, dated Feb. 3, 2017.
1st Office Action received in Chinese Patent Application No. 2015-10518183, dated Dec. 15, 2016.
Application granted in Chinese Patent Application No. 2015-10518183, dated Jun. 14, 2017.

* cited by examiner

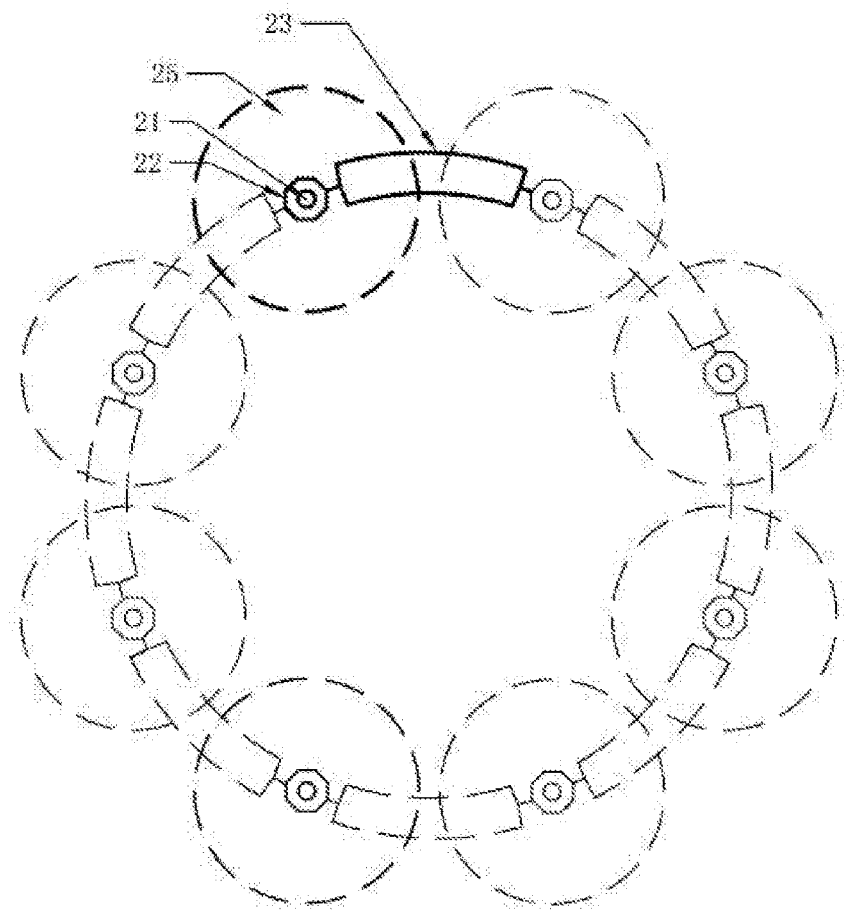
Figure 27b
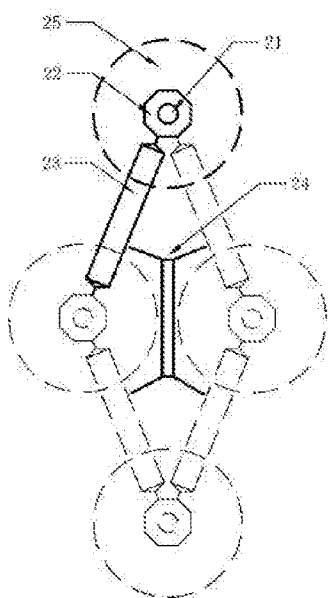
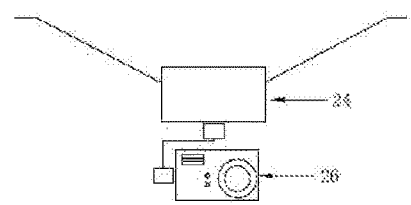
Figure 28a  Figure 28b

DRIVING DEVICE ASSEMBLY WITH MULTIPLE DRIVE DEVICES AND APPLICATION THEREOF

CROSS-REFERENCE TO RELATED APPLICATIONS

This application is a continuation application of International Patent Application No. PCT/CN2016/000308, filed Jun. 16, 2016, which itself claims priority to Chinese Patent Applications No. 201510363832.4, filed Jun. 29, 2015; No. 201510363831.X, filed Jun. 29, 2015; No. 201510363812.7, filed Jun. 29, 2015; No. 201510432369.4, filed Jul. 22, 2015; No. 201510518183.0, filed Aug. 21, 2015, which are incorporated herein by reference in their entireties.

FIELD OF THE INVENTION

This invention relates to the field of power systems and can be applied to combined drive devices in the fields of aircrafts, ships, excavating or tunneling machines, generator sets, combined light sources, wind power devices, sprinkling and spraying nets and the like. More specifically, the present invention relates to an aircraft for which drive devices and loads can be increased unlimitedly, and an aircraft of a modular combined structure having multiple flight modes.

BACKGROUND

Multiple drive devices working in combination can produce a stronger drive force. At present, taking an engine group (for example, an aircraft engine group) as an example: for devices such as combined engines or the like, most of them have a tandem, linear, square, or annular arrangement. In such arrangements, due to the complicated connection between the engines in the assembly, unnecessary spaces and voids may be generated between the engines, thus causing increase of the volume and weight of the assembly. The System has a complicated mechanics structure, non-uniform component forces in the system mechanics structure of components connected and fixed between the engines at different positions in the assembly result in a stress concentration in the assembly (system). Unlimited accumulation of engines will eventually cause collapse of the connection structure, and therefore, the number of engines in the assembly cannot be increased unlimitedly, and the loading capacity is limited.

A fuselage is a load bearing platform of an aircraft. Aircrafts having multiple drive devices are currently widely used, the fuselages of those aircrafts have more or less the same components, and are mainly constituted by a "central load bearing plate or cabin", arms and a landing gear, wherein the "central load bearing plate or cabin" and the arms form a radial structure which is divergent outwards from a center point. This structure has advantages of simple structure, light weight or the like in the case that the aircraft has a relatively small size. With the increasing demand on load bearing capacity of the aircraft in the future, the problem with this structure is that as the drive devices become more and more, rotating plane of the propellers or the drive devices will occupy larger spaces, and consequently the size of the fuselage will inevitably increase, and as such a situation continues to develop, the stress concentration problem of aviation materials and the structure will become more serious, and "weight increase for reinforcement" is required to address the above problem. In addition, an increase of the "dead weight" of the fuselage structure will also weaken the limited drive force of the drive devices, thus increasing energy consumption. Assuming these problems are neglected, unlimited expansion of the size of the aircraft will inevitably trigger a chain reaction caused by excessive loss of the drive force due to by the structure weight and stress yield of partial structure, and finally the structure will collapse.

In addition, a common shortcoming of the current helicopter aircrafts is that almost no lift can be generated by the structure itself, energy consumption is high, the voyage is short and the residual power is insufficient in a harsh environment, thus making it hard to resist strong air flow changes. Under particular climatic conditions, the stability is not good, so various flying missions can not be fulfilled stably for a long time.

SUMMARY OF THE INVENTION

In a first aspect, the invention provides a drive device assembly such that more drive devices can be accommodated per unit volume. The drive device assembly optimizes the mechanical structure of the assembly, and realizes uniform distribution of the weight of the aircraft itself and the load when the assembly is applied to an aircraft. The drive device assembly can be well extended unlimitedly, and can generate a strong drive force in conjunction with a simple and light weight installation, while simultaneously having characteristics such as small volume, light weight, high connection strength, high load bearing capacity and so on.

Thus, present invention provides a drive device assembly having multiple drive devices distributed as follows:

a. three of the drive devices form a triangular unit, the three drive devices are located at vertices of the triangular unit, and other drive devices are distributed outside the triangular unit and at the intersection points of the following three groups of parallel lines: each group of parallel lines comprise an equidistant line in parallel with a side of the triangular unit and a line where the side is located, wherein the spacing of each group of parallel lines is the height length of the corresponding side of the triangular unit; the number of the drive devices is greater than or equal to 3, 4, 5, 6, 7, 8, 9, 10, 15, 24 or 30; or b. four of the drive devices form a tetrahedron unit having four triangular faces, vertices of the tetrahedron unit are the centers of the four drive devices, the tetrahedron unit is taken an initial unit body, and other drive devices are distributed outside the initial unit body and are sequentially incorporated therein in such a way that each of the other drive devices and a triangular face of the unit body form a tetrahedron unit; and the number of the drive devices is greater than or equal to 4, 5, 6, 7, 8, 9, 10, 15, 24 or 30.

In a preferred embodiment, the triangular unit is an equilateral triangle, or the tetrahedron unit is a regular tetrahedron.

In a preferred embodiment, the drive devices are connected by a connecting cabin or a connecting device, and the connecting cabin or the connecting device is selected from but not limited to a skeleton, a plane body, a plane body hollow region.

In a preferred embodiment, the connection cabin or the connecting device achieves a fixed connection or a movable connection.

In a preferred embodiment, the drive device is an electric drive device, an internal combustion engine drive device, a fluid and hydraulic drive device, a pneumatic drive device, a manual power drive device or a complex drive device.

In a second aspect, the present invention provides an aircraft for which drive devices and loads can be increased unlimitedly, so as to address the problems concerning the number of engines in the aircraft and the upper load limit.

Therefore, the present invention further provides a system or an aircraft having multiple drive devices, the system comprising the drive device assembly according to the first aspect of the present invention.

In a specific embodiment, the aircraft includes wings mounted on the drive device assembly so as to form an aircraft having multiple flight modes.

Such aircraft with multiple flight modes organically integrates the features of a helicopter aircraft and a fixed-wing aircraft so that the aircraft can fly both in a high-speed and energy-saving mode for a long distance and in a low-speed accurate mode, demonstrating its advantage of combining multiple flight modes in a complicated flight mission.

In a preferred embodiment, the positions of the aircraft other than the installation positions occupied by the drive devices and the wings are installation or load carrying positions for flight auxiliary devices or loads.

In a preferred embodiment, the wings are rotated in an axial direction so as to serve as a landing support device for the aircraft.

The drive device assembly according to the present invention enables more drive devices to be accommodated per unit volume, and the drive device assembly optimizes the mechanical structure of the assembly; with a configuration that eliminates mechanical center, the weights of the drive devices are uniformly distributed onto the connecting structure, such that the weight of the assembly is uniformly carried by the drive devices in the assembly. The addition of each drive device will not exert pressure on the overall system; instead, after the drive force generated by the drive device bears the mass of the drive device itself, the remaining power is accumulated in the drive device assembly so as to increase the total power and loading capacity of the drive device assembly. Therefore, the drive device assembly can well extend the number of the drive devices unlimitedly, and can generate a strong drive force in conjunction with a simple and light weight installation, while simultaneously having characteristics such as small volume, light weight, high connection strength, high load bearing capacity and so on.

In a third aspect, the invention further provides the drive device assembly according to the first aspect of the present invention or the aircraft according to the second aspect of the present invention, wherein the drive device assembly or the aircraft is assembled in the form of module groups, and the module groups include a drive device unit, a connecting cabin unit and an auxiliary unit.

In an embodiment, the aircraft includes a drive device module, a connecting module, a load bearing module and an auxiliary module, the drive device module constitutes a drive device unit, the connecting module and the load bearing module may be considered as a connecting cabin unit, and the drive device module and the load bearing module are assembled by the connecting module as an aircraft structural unit. The load bearing module also serves as a fuselage structure of the aircraft at the same time of carrying energy and load. The load bearing module is provided with a load bearing space and a connecting position for other modules or devices; and the connecting module is provided with a connecting position for other modules or devices.

Auxiliary modules, i.e., auxiliary units, can be optionally added to the structural unit of the aircraft, and the form of the auxiliary modules is not fixed. The auxiliary modules have a wide range of functions and are used for making up the deficiencies of the above modules. In the whole aircraft structure, some auxiliary modules can even function to replace some of the above modules. For example, when the aircraft needs to carry functional loads such as video equipment, weapon systems and radio systems, the auxiliary module will function as a connecting hanger and is responsible for the connection between the above systems and the aircraft. When the aircraft needs to carry large-sized irregularly shaped loads, the auxiliary module will function as a connecting member between the load and the aircraft. When the weight of the battery and/or other loads carried by the load bearing module is large, an auxiliary module may be added at the structural unit so as to increase the connection strength of the whole structure of the aircraft. When the aircraft does not need to carry heavy loads or carry more energy, the auxiliary module may be also used as a connecting device between the drive device modules, that is, the fuselage structure of the aircraft is constituted by the load bearing module and the auxiliary module altogether.

The number of the modules constituting the structural unit of the aircraft is X, wherein $X \geq 0$. As actually required, the structural units may vary from each other, have different number of modules, and the modules can be matched and assembled to each other arbitrarily. Since energy and load are redistributed in the structure, each of the structural units can provide power and bear load independently, and can also be in a cascade configuration for energy and power, so that the structure of the aircraft can be unlimitedly accumulated and well extended as required, thereby improving the flight duration and loading capacity. The load bearing module can carry, without limitation, the energy for the drive device module to produce the drive force, other loads and auxiliary devices. The drive device module, the connecting module, the load bearing module and the auxiliary module may all serve as a bearing or mounting area for other loads.

The energy required for the drive device modules on the aircraft to generate the drive force can be batteries, fuels, chemical power generation devices and other energy sources. If the drive device module is electrically driven, the shape of the battery and the connecting line of the battery pack can be set as required, and the battery may be of an arc-shape, a circular shape, a square shape, etc. If the drive device module is driven by fuel, the load bearing module can carry chemical energy such as fuel. According to requirements, the battery (pack) or fuel may be disposed on the outer surface of the load bearing module, and may also be partially or completely disposed in the inner space of the load bearing module. The battery (pack) can also be directly connected to the drive device module so as to form the aircraft fuselage frame, that is, the battery (pack) not only provides power energy for the aircraft, but also serves directly as a connector of the aircraft frame.

The connecting module, the drive device module and the load bearing module on the aircraft may be of a one-piece structure, a movable structure or a split assembled structure. The outer shape of the load bearing module is not limited, and can be of a circuit tube shape, a square tube shape, a semicircular tube shape, an I-shape, an irregular shape and so on as required. The modules on the aircraft can be fixedly connected, and can also be movably connected.

In summary, the modular aircraft redistributes energy and load, changes the force transmission path of the structure, and optimizes the stress distribution between the structures, therefore addressing the problems of complicated mechanical structure and load concentration of the conventional aircraft, and enabling the present aircraft structure to be well extended unlimitedly as required. In addition, the present invention adopts a modular assembled structure to make the parts in the aircraft be universalized and standardized.

The present invention can be widely applied to the fields of aerospace, industry, agriculture, environmental protection, fire protection, urban construction, science and technology and other fields that require the devices to work in combination.

BRIEF DESCRIPTION OF THE DRAWINGS

Further objects, functions and advantages of the present invention will be elucidated from the following description of the embodiments of the present invention with reference to the accompanying drawings, wherein.

several preferred embodiments of the present invention will be briefly described hereinafter with reference to the accompanying drawings.

Figure 1:
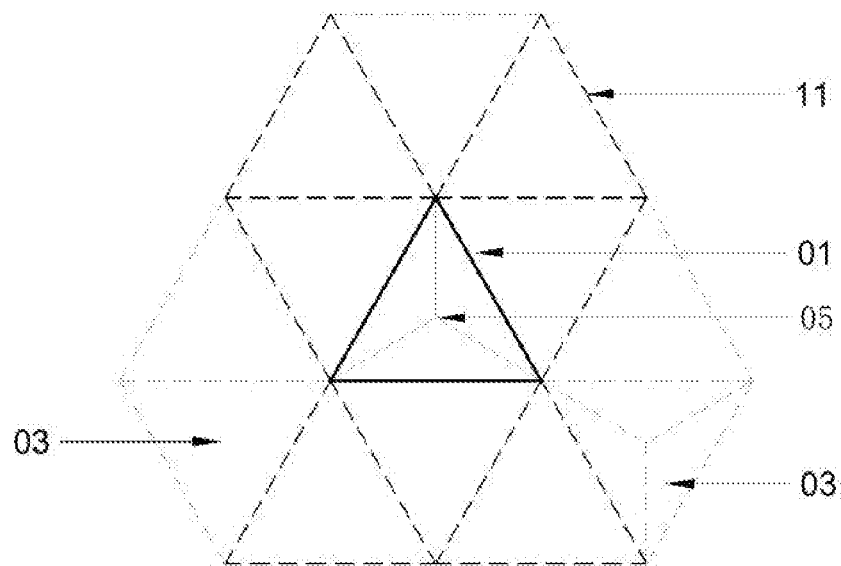
FIG. 1 is a schematic diagram of the arrangement layout of the drive devices of the present invention.

Reference numerals in FIGS. 1-24: 01—triangular drive device module, 02—node, 03—mapped body, 04—skeleton, 05—drive device, 06—plane body, 07—hollow region, 08—drive force converting device, 09—transmission, 10—combined force output shaft, 11—geometric structure reference line, 12—drive force output shaft, 13—skeleton connector, 14—propeller, 15—engine mount, 16—engine, 17—load, 18—wing, 19—wing connector, 20—horizontal reference line.

Figure 25A:
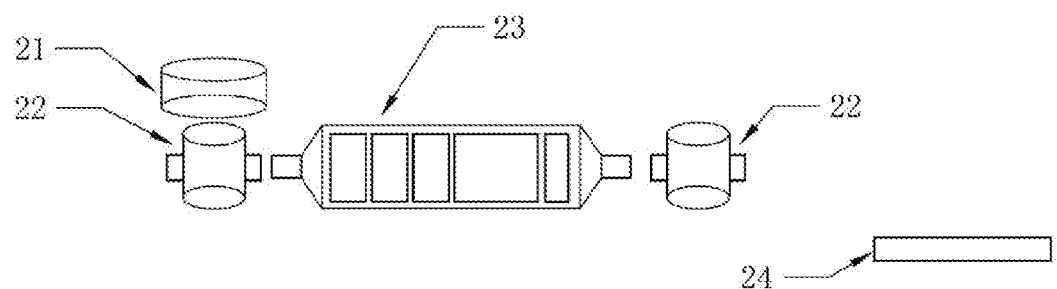
Figure 27A:
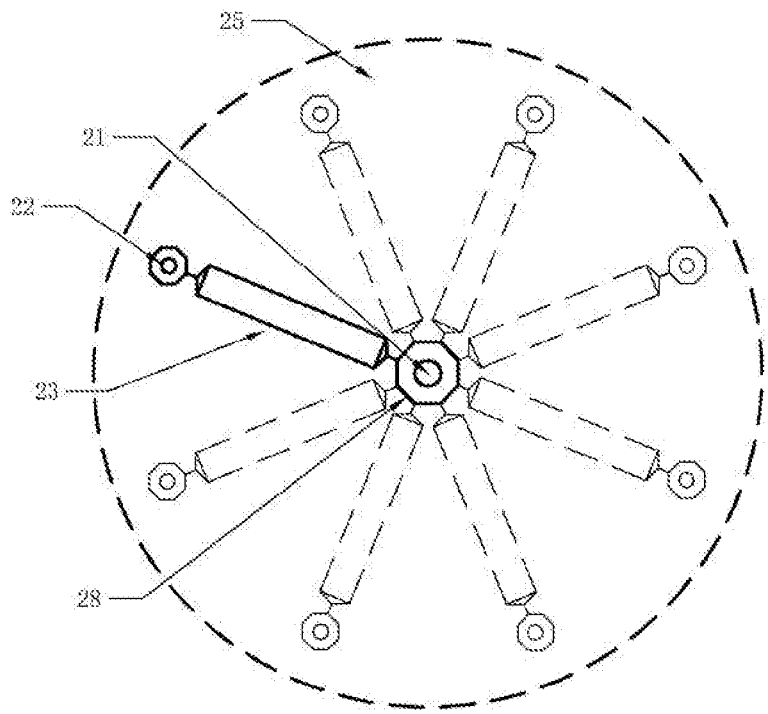
Figure 29:
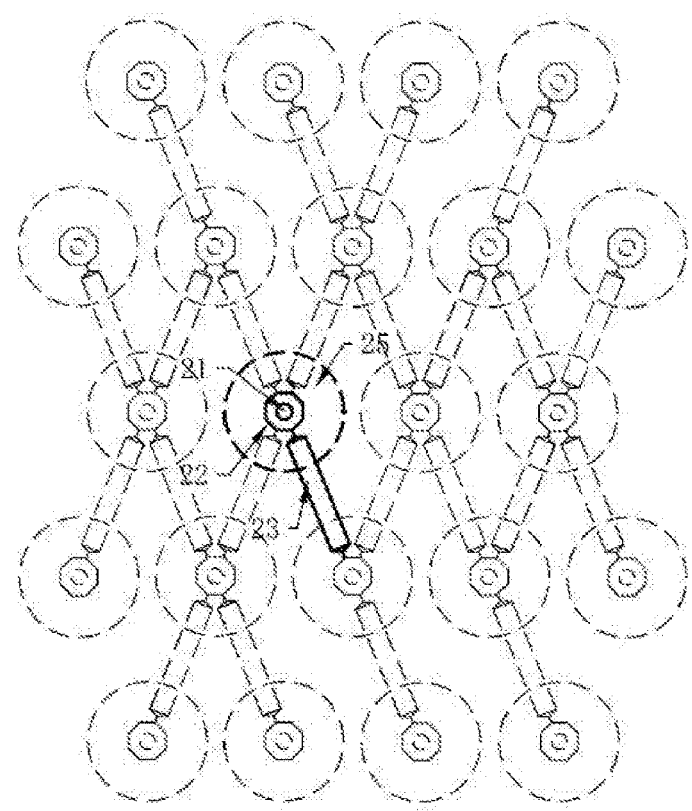
Figure 30:
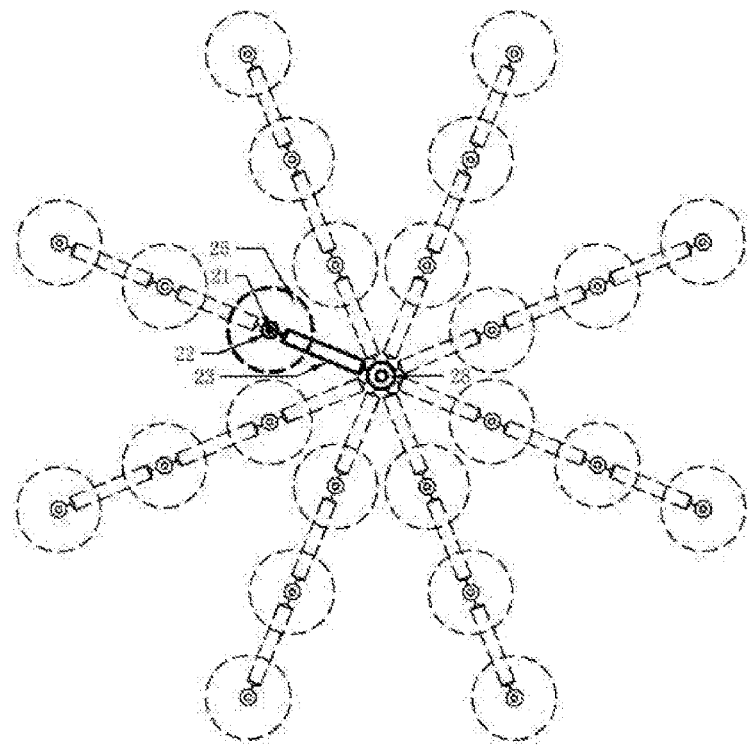
Figure 31:
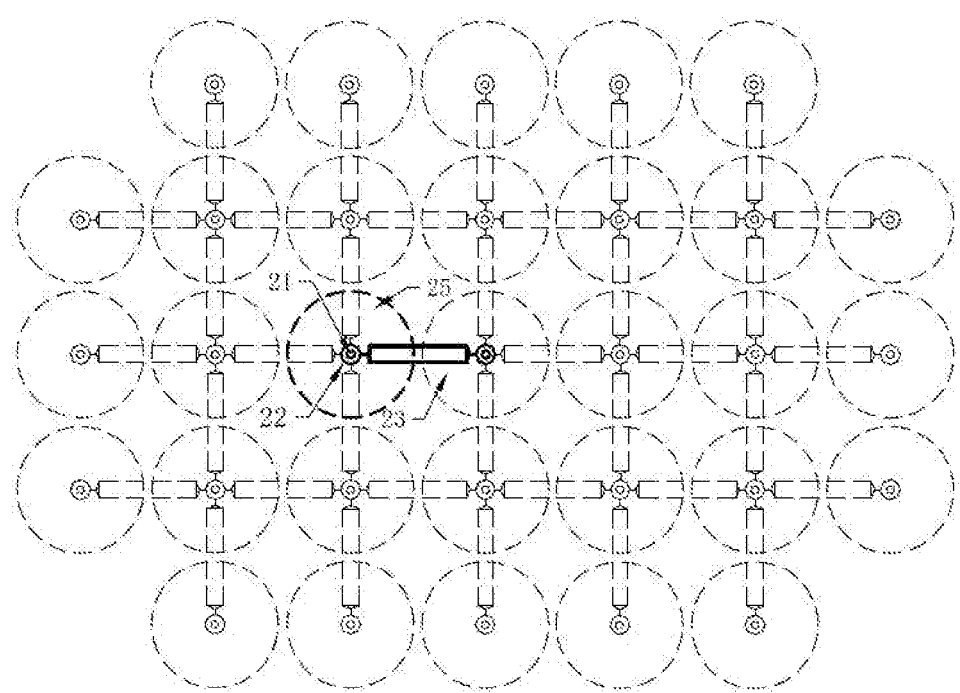

FIG. 25a is a schematic view of the various modules of the present invention;

FIGS. 25b, 25c, 25d, 25e, 25f are schematic views of modular structural units of the present invention;

FIGS. 26a, 26b, 26c, 26d and 26e are top views of different embodiments of the modularity of the present invention;

FIGS. 27a and 27b are top views of particular embodiments of the modularity of the present invention;

FIGS. 28a and 28b are a top view and a partial side view of an embodiment of the modularity of the present invention;

FIG. 29 is a schematic diagram of an extended embodiment of the modularity of the present invention;

FIG. 30 is a schematic diagram of an extended embodiment of the modularity of the present invention; and FIG. 31 is a schematic diagram of an extended embodiment of the modularity of the present invention.

In FIGS. 25-31: 21—drive device module, 22—connecting module, 23—load bearing module, 24—auxiliary module, 25—propeller rotating plane, 26—other loads, 27—propeller, 28—central connecting module

DETAILED DESCRIPTION OF THE EMBODIMENTS

The objects and functions of the present invention and methods for achieving these objects and functions will be elucidated with reference to the exemplary embodiments. However, the present invention is not limited to the exemplary embodiments disclosed below, and it can be implemented in various forms. The essence of the description is merely to assist those skilled in the art in comprehensively understanding the specific details of the present invention. Hereinafter, embodiments of the present invention will be described with reference to the drawings. In the drawings, identical reference numerals indicate identical or similar components, or identical or similar steps.

The basic principle of the combined drive devices of the present invention is that the drive devices are arranged in a triangle so as to form a triangular drive device module. In a preferred combination method, the spatial distances between adjacent drive devices are equal; the triangularly arranged drive device modules are mapped and arranged towards the spatial direction so as to be combined as a drive device assembly constituted by multiple drive devices. The number of the drive devices in the drive device assembly is N, wherein N≥3. The distance between adjacent drive devices in the drive device assembly is ≥0. The number of the drive devices in the drive device assembly can be increased or decreased as required. The overlapped positions of the triangular modules assemblies in the arrangement of the drive device assembly can be regarded shared positions.

The drive device mapping, arranging and combining method of the present invention can be expressed by the following geometric way. The triangle ABC as shown is an equilateral triangle, and side BC of the equilateral triangle ABC is taken as an axis so as to obtain a central symmetric equilateral triangle BCD of the triangle ABC, thus forming a diamond ABCD. Sides AB, BD, CD, AC of the diamond are reversely extended towards both sides, and sides having the same length as that of the sides of the diamond are obtained by cutting; corresponding points are connected so as to form numerous diamonds, thus forming a diamond network block; short diagonal lines of all of the diamonds are connected so as to form a geometric structure constituted by numerous equilateral triangles.

Another drive device mapping, arranging and combining method of the present invention can also be expressed by the following geometric way. The triangle ABC is an equilateral triangle, and three points A, B, C are respectively taken as central symmetry points so as to obtain central symmetric triangles ADE, CFG and BHI of the triangle ABC, and points D, E, F, H, I are taken as central symmetry points so as to obtain equilateral triangles . . . ; in this way, a geometric structure constituted by numerous equilateral triangles can be obtained.

In the spatial structure, on the basis triangular modules, an assembly constituted by N drive devices is constructed using a different three-dimensional geometric layout, wherein N≥3. In the construction method, the triangle ABC is an equilateral triangle, and three-dimensional symmetrical triangle of the triangle ABC can be obtained by taking any one of the vertices or sides of the triangle ABC as the central symmetry point or symmetry axis, and in this way, a geometric structure constituted by numerous equilateral triangles can be obtained.

The nodes in the above geometric structural solutions are the preferred positions of the drive devices.

According to different requirements, the number of drive devices in the drive device assembly and the positions of installation nodes can be set arbitrarily on the basis of not violating the principle. Under the premise of ensuring a safe and stable operation of the assembly, the number of the drive devices in each triangular module can also be increased or decreased according to the structural requirements. In addition, according to different requirements, drive devices having the same specification and the same function can be chosen for installation, or drive devices having different specifications and different functions can be also chosen for installation.

The drive devices are connected by a connecting cabin or a connecting device. The connecting cabin or the connecting device may be embodied as, without limitation, a skeleton, a plane body or a plane body hollow region. The connecting cabin or connecting device can be made separately or mounted in a plane-shaped, grip-like structure. If the drive devices are connected by way of skeleton, they may be fixedly or movably connected. If the drive devices are connected by way of plane body or plane body hollow region, the drive devices can be directly mounted to the surface of the plane body, or may also be embedded into a hollow space of the plane body hollow region.

The drive devices in the drive device system according to the present invention may be respectively connected to a drive force converting device so as to convert the drive force into an outward output action force, or after the drive forces generated by drive devices in the drive device system are combined, the drive force converting device is connected so as to convert the drive force into an outward output action force.

According to the prior art, the drive device in the present invention is preferably an engine, and the engine may be connected to a propeller, a transmission, a tractor, a tunneling device and the like.

In the following, an example in which the engine is taken as the drive device will be described; the engines are fixed by a plane-shaped structure or a skeleton structure, and the device constructed according to this solution can install different types or models of engines. The engines may be controlled separately, and may also be controlled in a combined or mixed manner. In the devices constructed according to this solution, the engines may work separately, in a partially combined manner or a fully combined manner.

Each engine in the device constructed according to the solution of the invention can output the action force after the powers generated by the engines are converted and combined; for example, the engines are connected to propellers so as to convert the powers into wind powers or hydraulic powers and then combine the wind powers into a strong wind power or the hydraulic powers into a strong hydraulic power.

In the device constructed according to the solution of the present invention, the powers of the multiple engines can be fully combined or partially combined and then be output by a main shaft. For example, the engines may transmit the powers to the main shaft by a transmission device through a transmission shaft, air transmission, hydraulic transmission and the like, and the action force is output by a combined output shaft, or by a power converting device connected to the main shaft.

In addition to the engines, the preferred embodiment of the present invention can be used to mount generators, light sources, nozzles, or other devices that need to work in combination, and the region in the system other than the region occupied by the drive devices can be used as an installation or load bearing region for other devices.

One of notable features of the aircraft of the present invention is that the drive devices are arranged in a triangle such that more drive devices can be accommodated per unit volume, and the aircraft can maintain an optimal spatial layout under the condition of acquiring equal propulsion.

The basic principle is that the aircraft drive devices are arranged in a triangle to form a triangular drive device module; in a preferred combination method, the spatial distances between adjacent drive devices are equal; and on the basis of the drive device module arranged in a triangle, the drive devices are mapped, arranged and combined towards a spatial direction to form the drive device assembly constituted by the multiple drive devices, and the number of the drive devices in the drive device assembly is N, wherein N≥3.

A preferred method for mapping, arranging and combining the drive devices can be expressed in the following geometric way. The triangle ABC is an equilateral triangle, and a side BC of the equilateral triangle ABC is taken as an axis so as to obtain an axial symmetric equilateral triangle BCD of the triangle ABC to form a diamond ABCD. AB, BD, CD and AC of the diamond are reversely extended towards both sides, and sides having the same length as that of the sides of the diamond are obtained by cutting; corresponding points are connected so as to form numerous diamonds, and then short diagonal lines of all the diamonds are connected to form a diamond geometric structure constituted by numerous equilateral triangles. Nodes of the geometric structure are regarded as preferred installation positions of the drive devices, and the overlapped positions of the nodes are regarded as shared positions. The drive devices can be installed in all spatial directions of the nodes as actually required. In addition, the shape of the drive device assembly and the number of the drive devices can vary accordingly as required for flight environment, load weight, form and the like.

In the present invention, if the aircraft adopts a kind of jet-type drive device having a small rotary torque, or having no reverse torque or having a reverse torque that can be self-offset, such as a jet drive device or an coaxial reverse propeller or multi-propeller drive device, a combination of odd or even number of drive devices can be chosen. If a drive device generating a strong rotational torque is used, for example, when connecting an engine to a propeller, preferably, odd number of engines are required so as to connect the propeller for offsetting the reverse torque. Currently, in most aircrafts driven by multiple drive devices, the engine is connected to the propeller; therefore, the preferred solution of the present invention is a diamond mapping, i.e., a diamond module is formed on the basis of equilateral triangles, and engines can be installed at the nodes of the diamond in a stacked manner.

In an assembly constructed on the basis of a diamond drive device module (constituted by two triangular modules) in the geometric structure, due to the structure and functional characteristics of the aircraft, the spatial distance of the diagonal line in the diamond module can be adjusted as required by the aircraft, and the vertex angle of the diamond in the connecting member constituted by the geometric structure can be adjusted.

In the present invention, the drive devices of the aircraft are connected by a connecting member, and the connecting member can be embodied as, without limitation, a skeleton or other connectors. According to the characteristics of the aircraft and existing technical conditions, the aircraft can preferably employ a skeleton connection, and the skeletons can be fixedly or movably connected to each other. Employing fixed skeletons means an integral skeleton can be produced or the skeleton assembly can be fixed by fixing connectors. Movable skeletons are connected by movable connectors, so that a collapsible or detachable skeleton is produced. In use, the skeleton is restricted from moving by a fixing member so as to form a stable mode. When it is required to reduce the volume, the fixing member for restricting the moving of the skeleton is released, and the collapsing or detaching of the skeleton can be realized, thus effectively reducing the volume of an aircraft, especially for a large aircraft, and facilitating storage and transportation.

A second major feature of the present invention is that the size and shape of the aircraft can be determined according to the flight environment, the form and weight of the load. The regions on the aircraft other than the installation positions occupied by the drive devices can be used as installation or carrying regions for flight assistance devices or loads. Owing to the special construction of the aircraft of the present invention, in the region of each of the drive devices or each set of drive devices in the aircraft drive system, a load carrying region or a region connected to the overall load can be provided. The purpose of such an arrangement is to allow the drive force generated in the aircraft drive system to be uniformly applied to the load bearing portions, and the connection between the drive device and the load in the aircraft will not cause a series of adverse chain reactions that affect the overall flight system due to stress concentration in a certain region.

The aircraft having multiple flight modes according to the present invention has wings installed on the basis of the aircraft drive devices and the number of the wings is M, wherein M≥1. For example, in the case of skeleton connection, each of the wings is connected to the skeleton of the aircraft via a connector and can rotate axially. During the flight, when there is a relative speed between the aircraft and the air, with a proper adjustment of the attack angle, the wing will generate a lift force to assist the drive device in providing a lift force to the aircraft; especially in a low speed flight, the wings are adjusted at different angles so as to match different flight attitudes of the aircraft, thus minimizing adverse resistance force to the maximum degree. In particular cases, when the aircraft has a relative speed with respect to air, the aircraft can fly or decelerate by means of the wings. For example, when the drive devices of the aircraft fail, the wings can be used for gliding as a buffer, thus effectively protecting the aircraft, or the rotating angle of the wing can be adjusted so as to allow the wing to generate a resistance force in the advancing direction, thereby decelerating the aircraft.

The wings arranged in correspondences at right and left sides generate a rolling force by changing the angle difference so that the aircraft can roll laterally, which is similar to the function of an aileron rudder of a fixed-wing aircraft. The wings arranged in correspondences at front and rear or a single wing generate(s) an ascending force or a descending force by adjusting the attack angle so as to allow the aircraft to pitch longitudinally, which is similar to the function of an elevator rudder of a fixed-wing aircraft. When the aircraft is flying at a certain speed, the wing can generate an additional lift so as to reduce the burden on the drive devices. Moreover, the rudder surface effect generated by manipulating the wings makes it possible to reduce the burden on the drive devices even when the aircraft changes its attitude, thus saving energy to some extent, prolonging the flight duration and improving loading capacity.

In addition, when the wing rotates axially to reach a certain angle with the fuselage plane, the wing can also serve as a landing support device of the aircraft, i.e., a landing gear, thus effectively reducing the structural load and take-off weight of the aircraft.

The specific embodiment also provides a preferred solution for the connection of the drive device combination system.

The technical solutions in the embodiments of the present invention are described hereinafter with reference to the drawings of the embodiments of the present invention. Apparently, the described embodiments are merely some but not all of the embodiments of the present invention. All the other embodiments obtained by those skilled in the art based on the embodiments of the present invention without creative efforts shall fall within the protection scope of the present invention.

Reference is made to FIGS. 1 to 4, in a method for generating a combined drive force through a drive device assembly according to this embodiment, the drive devices (05) are arranged in a triangle so as to form a triangular drive device module (01), and in a preferred combination method, the spatial distances between adjacent drive devices (05) are equal; the region indicated by thick solid lines as shown in FIG. 1 is an equilateral triangle, and three vertices thereof, i.e., the nodes (02) can be regarded as mounting positions of the drive devices (05. The triangular module (01) of the drive devices arranged in the triangle in FIG. 1 is taken as a basis, and the drive devices (05) are mapped, arranged and combined towards the spatial direction so as to form a drive device (05) assembly constituted by multiple drive devices (05). In the drive device (05) assembly, the number of the drive devices (05) is X, wherein X≥3, and (03) is a mapped body of the triangle in the geometric structure, and (11) is a reference line of the geometric structure.

Figure 2:
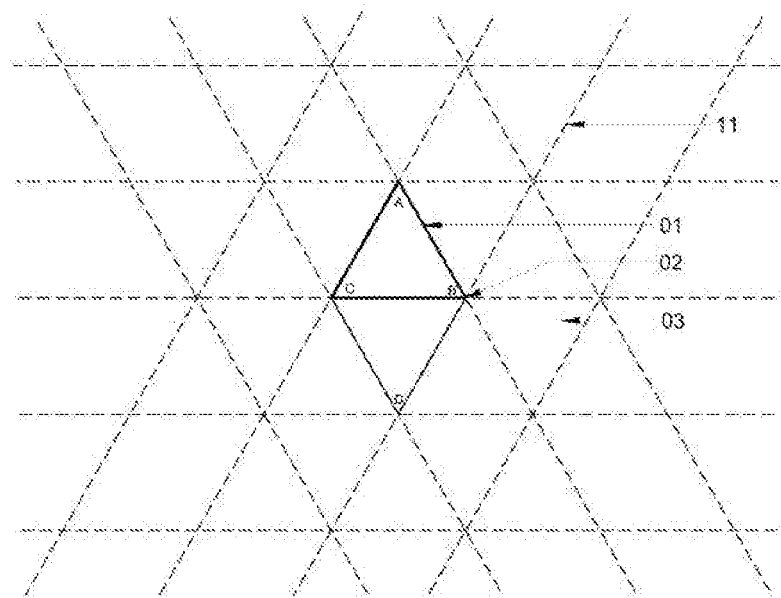
FIG. 2 and FIG. 3 are schematic diagrams of the arrangement layout of the drive devices of the present invention illustrated in a plane geometric manner.

The preferred planar method for assembling multiple drive devices can be expressed by the following geometric manner. As shown in FIG. 2, the triangle ABC is an equilateral triangle, and a side BC of the equilateral triangle ABC is taken as an axis to obtain an axial symmetric equilateral triangle BCD of the triangle ABC to form a diamond ABCD. The sides AB, BD, CD, AC of the diamond are reversely extended towards both sides, and sides having the same length as that of the sides of the diamond are obtained by cutting; corresponding points are connected so as to form numerous diamonds, forming a diamond network block; then the short diagonal lines of all of the diamonds are connected so as to form a geometric structure constituted by numerous equilateral triangles (03).

Figure 3:
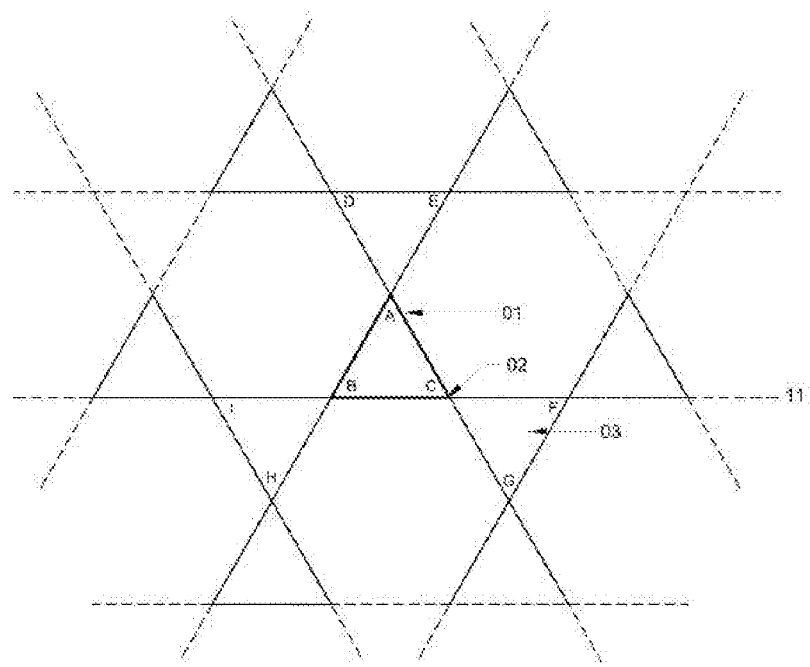

Another preferred planar method for assembling multiple drive devices can be specifically expressed by the following geometric manner. As shown in FIG. 3, the triangle ABC is an equilateral triangle, and three points A, B, C are respectively taken as central symmetry points to obtain central symmetric triangles ADE, CFG and BHI; points D, E, F, H, I are taken as central symmetry points respectively so as to obtain equilateral triangles; in this way, a geometric structure constituted by numerous equilateral triangles (03) can be obtained.

Figure 4:
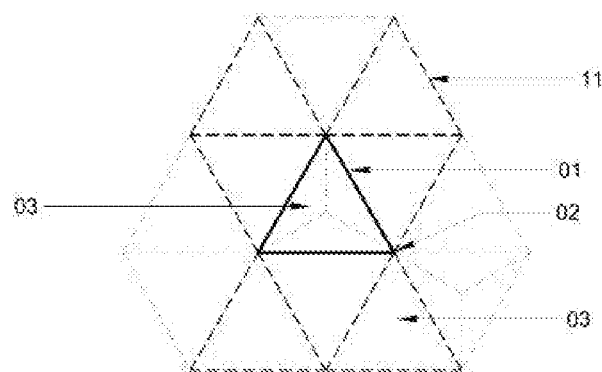
FIG. 4 is a schematic diagram of the arrangement layout of the drive devices of the present invention illustrated in a three-dimensional geometric manner.

A preferred three-dimensional method for assembling multiple drive devices can be expressed by the following geometric manner. As shown in FIG. 4, the triangle ABC is an equilateral triangle, and a three-dimensional symmetrical triangle (03) of the triangle ABC can be obtained by taking any one of the vertices or sides of the triangle as the central symmetry point or symmetry axis, and in this way, a geometric structure constituted by numerous mapped equilateral triangles (03) can be obtained.

The nodes (02) in all of the above geometric structures are regarded as the mounting positions of the drive devices (05). Drive devices (05) can be selectively installed at the nodes (02) as actually required.

Figure 5:
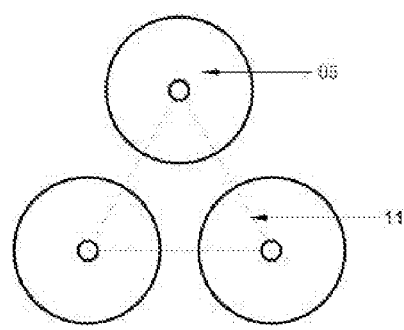
FIG. 5 is a schematic diagram of the arrangement layout of the drive devices arranged and assembled in an equilateral-triangle according to an embodiment of the present invention.

FIG. 5 shows the most basic triangular arrangement of the drive device assembly of the present invention. Preferably, an equilateral triangle arrangement is employed, i.e., the spatial distances between adjacent drive devices (05) are equal.

Figure 6:
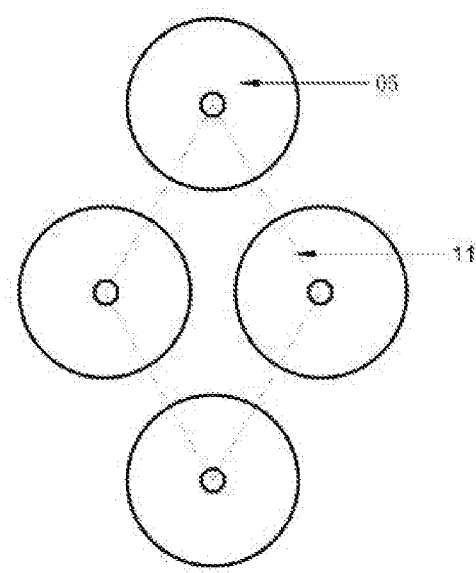
FIG. 6 is a schematic diagram of the arrangement layout of the drive devices arranged and assembled in a diamond according to an embodiment of the present invention.

FIG. 6 shows a diamond-shaped layout structure of the drive device assembly of the present invention, which is obtained by a combination of two equilateral triangles, and the overlapped positions are shared positions of the drive devices (05).

Figure 7:
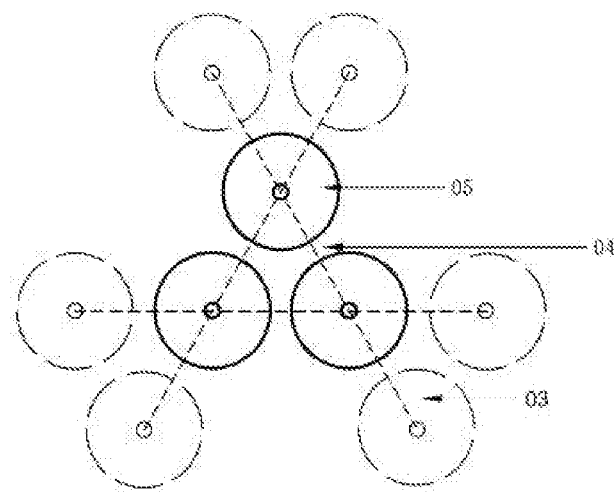
FIG. 7 is a schematic diagram of an embodiment of the arrangement of the drive device assembly.
Figure 8:
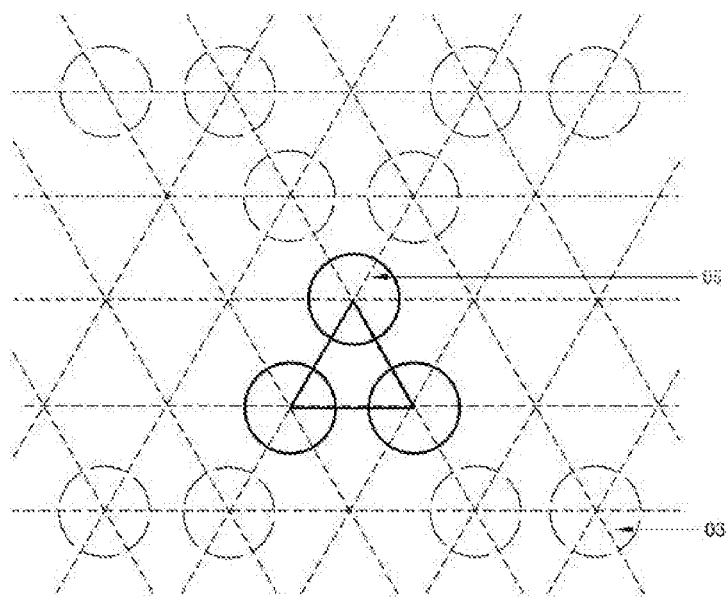
FIG. 8 is a schematic diagram of another embodiment of the arrangement of the drive device assembly.

FIG. 7 is a schematic diagram of a drive device assembly of the present invention, and is evolved from FIG. 3. FIG. 8 is a schematic diagram of another drive device assembly of the present invention, and is evolved from FIG. 2. The advantage of the present invention is that the drive devices (05) can be selectively installed at the nodes (02) as actually required so as to achieve the desired result.

Figure 9:
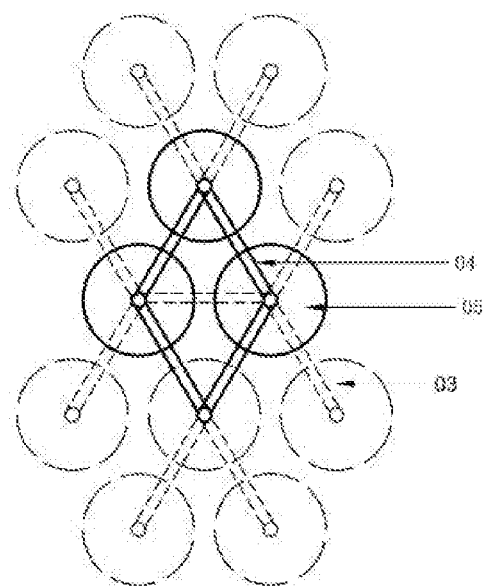
FIG. 9 is a schematic diagram of a preferred skeleton connection according to an embodiment of the present invention.
Figure 10A:
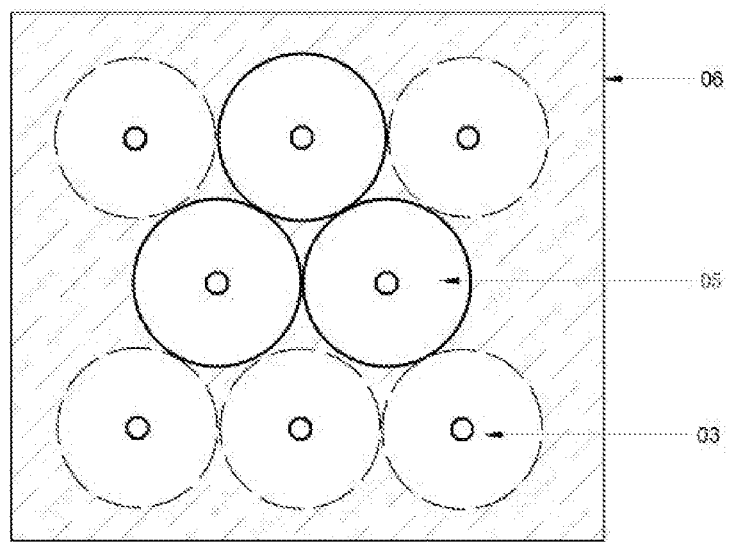
FIG. 10a is a top view and FIG. 10b is a side view of a schematic diagram of a preferred plane body installation according to an embodiment of the present invention.
Figure 10B:
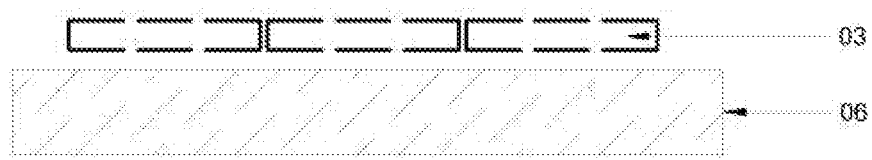
Figure 11A:
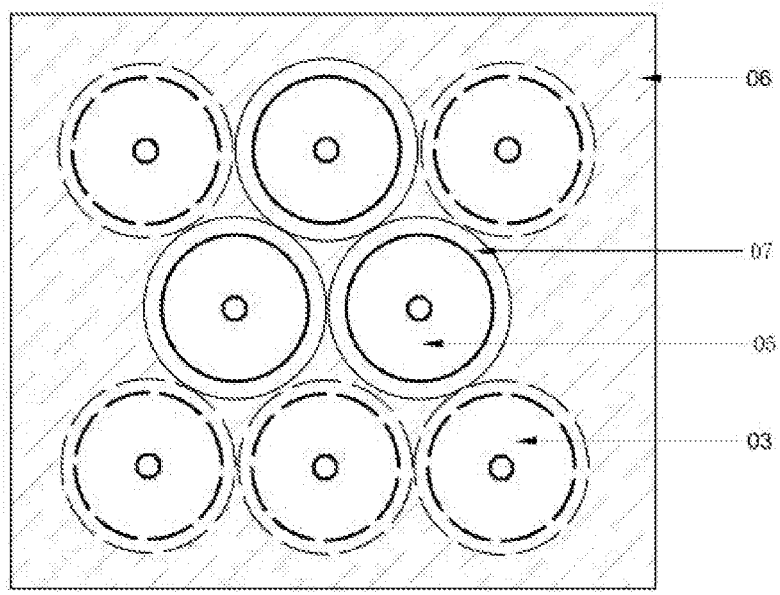
FIG. 11a is a top view and FIG. 11b is a side view of a schematic diagram of a preferred plane body hollow region installation according to an embodiment of the present invention.
Figure 11B:

In the present invention, the drive device (05) is preferably an engine according to the prior art, and the engine can be connected to a propeller, a transmission, a tractor, a tunneling device or other devices. The embodiment also provides a preferred connection mode in the system for combining the drive devices to generate a combined drive force. As shown in FIG. 9, the drive devices (05) are connected through skeletons (04), and the connection may be a fixed connection or a movable connection. As shown in FIG. 10*a*, the drive devices (05) are connected through a plane body, and the drive devices (05) can be mounted on the surface of the plane body (06), as shown in FIG. 10*b*. As shown in FIG. 11*a*, the drive devices (05) are connected by hollowing the plane body, that is, the drive devices (05) are installed in the hollow region (07) inside the plane body, as shown in FIG. 11*b*.

Figure 12A:
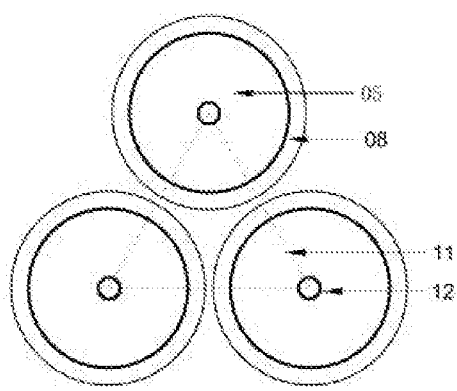
FIGS. 12a and 12b are schematic diagrams of a preferred drive force output mode of the present invention.
Figure 12B:
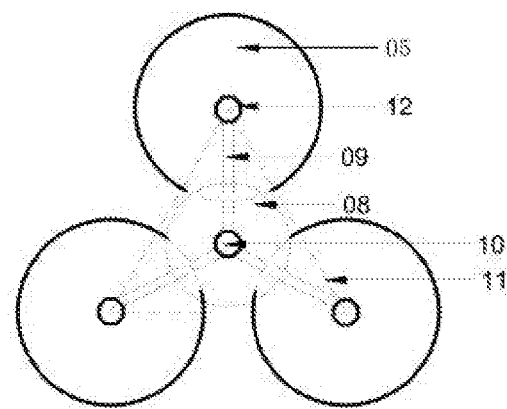

The drive devices (05) combined in the drive device assembly can be of the same specification and the same function, or can be of different specifications and different functions. In addition, the drive devices (05) in the drive device system can be respectively connected to a drive force converting device (08) so as to output the drive action force to the outside through a drive force output shaft (12), as shown in FIG. 12*a*. After the drive forces generated by the drive devices (05) in the drive device system are combined, the drive force converting device (08) is connected so as to output the drive action force to the outside through a combined force output shaft (10), as shown in FIG. 12*b*, wherein (09) is a transmission device.

It is worth noting that, in addition to the engines, the preferred embodiment of the present invention may also be used to mount generators, light sources, nozzles or other devices that need to work in combination, and the regions in the system other than the region occupied by the mounted drive devices may also be used as regions for mounting these devices or systems.

Figure 13:
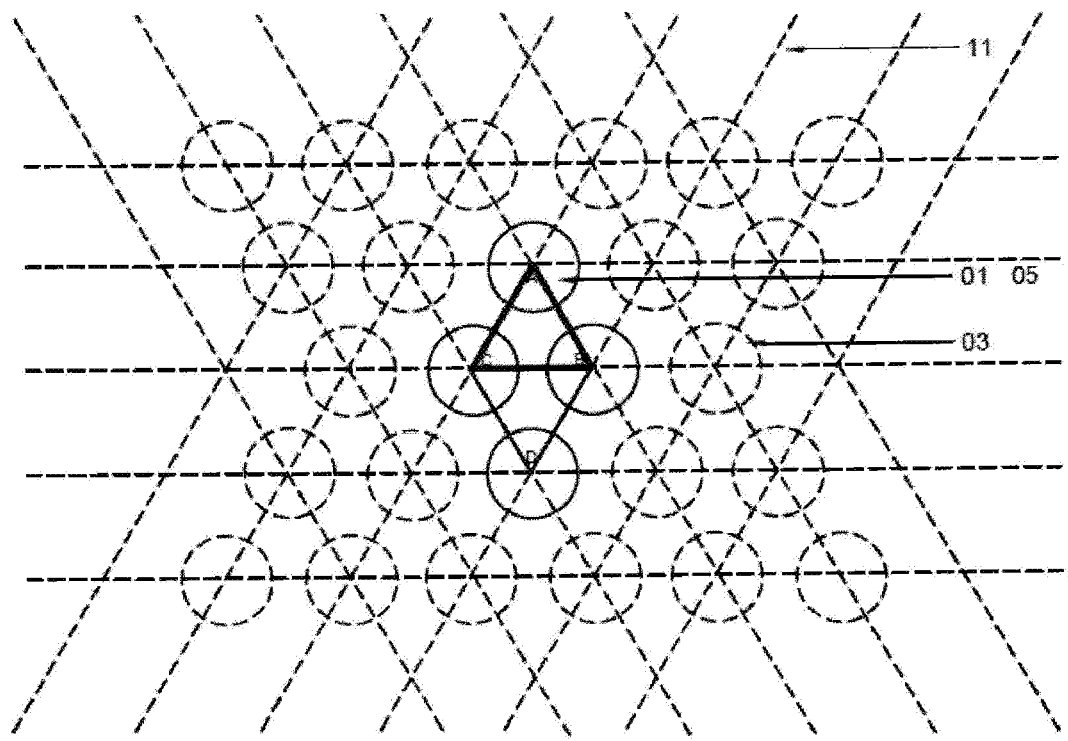
FIG. 13 is a schematic diagram of the basic distribution of the drive devices of an aircraft of the present invention.

FIG. 13 shows a basic distribution of the drive devices of the aircraft of the present invention, wherein the triangle ABC in the figure is an equilateral triangle, and three vertices of the triangle are the positions of the drive devices (05) of the aircraft, thus forming a triangle drive device module (01). Preferably, the spatial distances between adjacent drive devices (05) are equal. On the basis of the triangularly arranged drive device module (01), the drive devices are mapped, arranged and combined towards the spatial direction as a drive device (05) assembly constituted by the multiple drive devices (05). In the figure, the diamond ABCD is a diamond module derived from the triangular ABC drive device module, and in this way, various forms of the drive device (05) assemblies can be formed; the number of the drive devices (05) in the drive device (05) assembly is N, wherein N≥3. Specifically, (03) is a mapped body of the triangle in the geometric structure, and (11) is a reference line of the geometric structure.

The geometric method of the preferred embodiment of mapping, arranging and combining the drive devices in the aircraft according to the present invention is as described hereinbefore.

It should be noted that in order to realize the best dynamic effect of the aircraft, the drive devices (05) can be installed from all spatial directions at the nodes (02) in all the geometric structures, wherein the best effect is reached when the drive devices are mounted from an up-down direction of the nodes (02). In addition, the size and shape of the drive device (05) assembly and the number of the drive devices (05) can vary as desired.

The engine is taken as an example of the drive device, and several feasible layouts of the drive devices derived from the geometric structures and preferred connection solutions are described in detail hereinafter.

Figure 14:
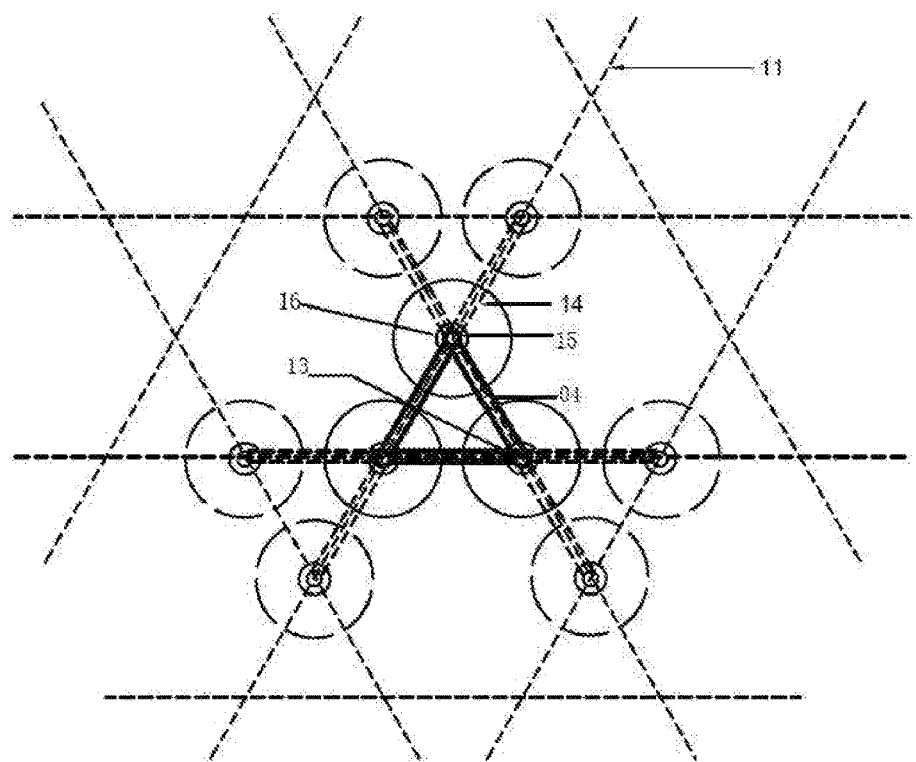
FIG. 14 is a schematic diagram of a feasible layout of the drive devices of the aircraft.

According to the geometric method of FIG. 3, three vertices of the equilateral triangle ABC are taken as the basis so as to obtain their central symmetric triangles (03) respectively, and engines (16) are mounted at the nodes (02), thus forming the engine (16) assembly as shown in FIG. 14. The engines (16) are fixed to the main frame through engine supports (15), and upper ends of the engines (16) are connected to the propellers (14) to be assembled as an aircraft having nine engines (16). The engines (16) can be selectively mounted from an up-down direction of the nodes (02) as required, and at most an eighteen rotor wing aircraft can be assembled.

Figure 15:
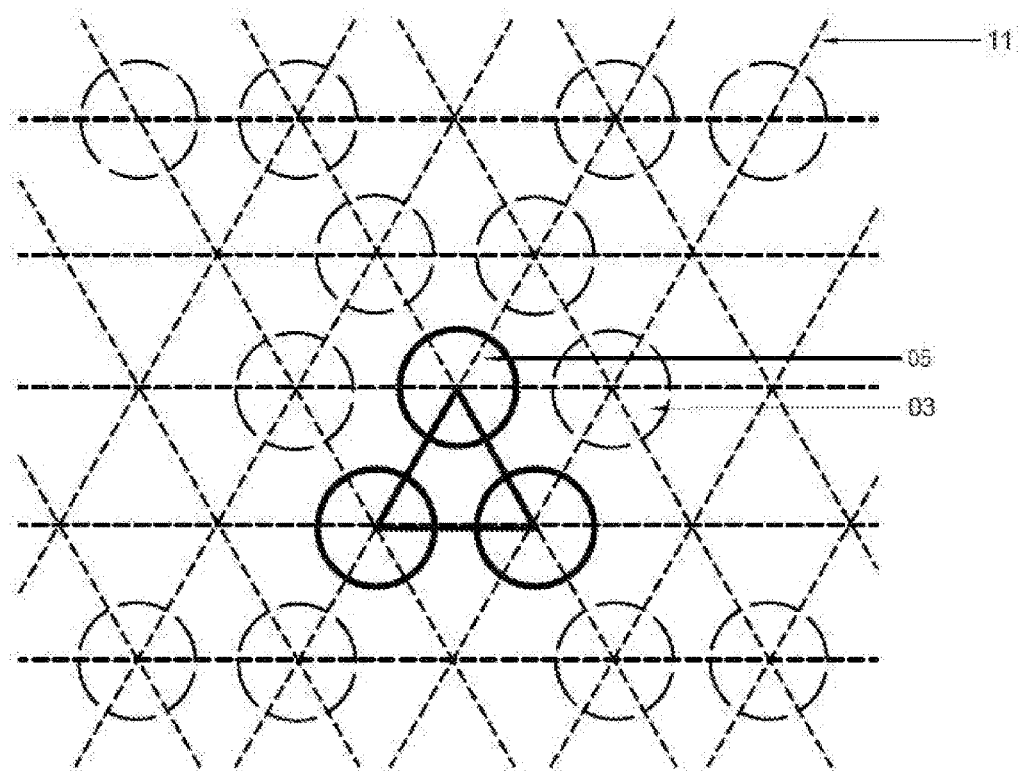
FIG. 15 is a schematic diagram of another feasible layout of the drive devices of the aircraft.

According to the geometric method of FIG. 2, the engines (16) are selectively installed at the nodes (02) to obtain the engine (16) assembly as shown in FIG. 15, and the propellers (14) are connected to the engines (16) so that a multi-axis multi-rotor wing aircraft can be assembled. Similarly, the engines (16) can be mounted from all spatial directions at the nodes (02) as required.

Figure 16:
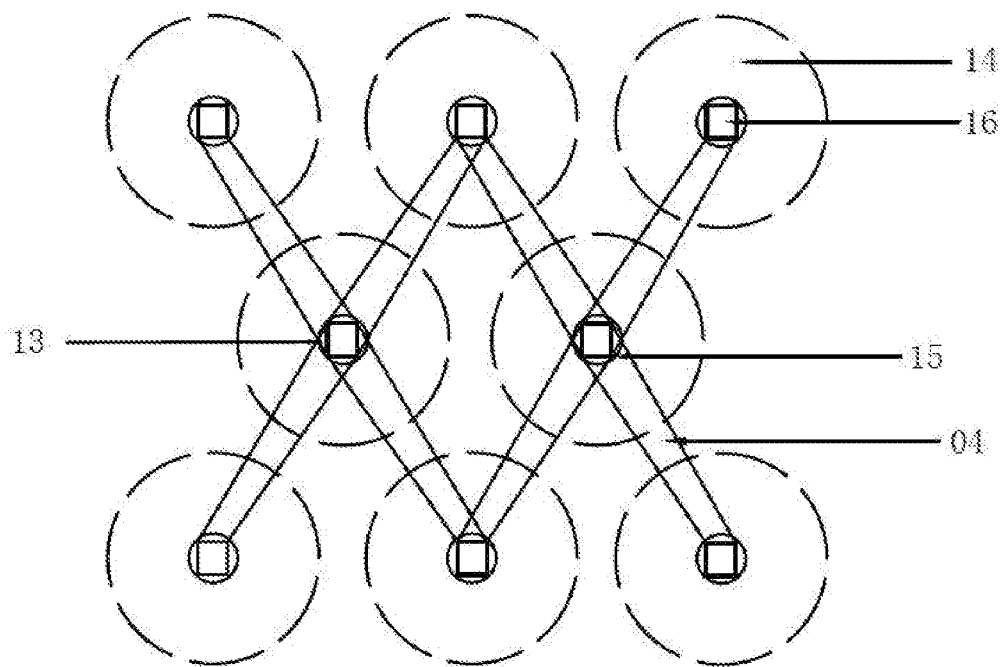
FIG. 16 is a schematic diagram of a preferred skeleton structure of the aircraft.
Figure 17:
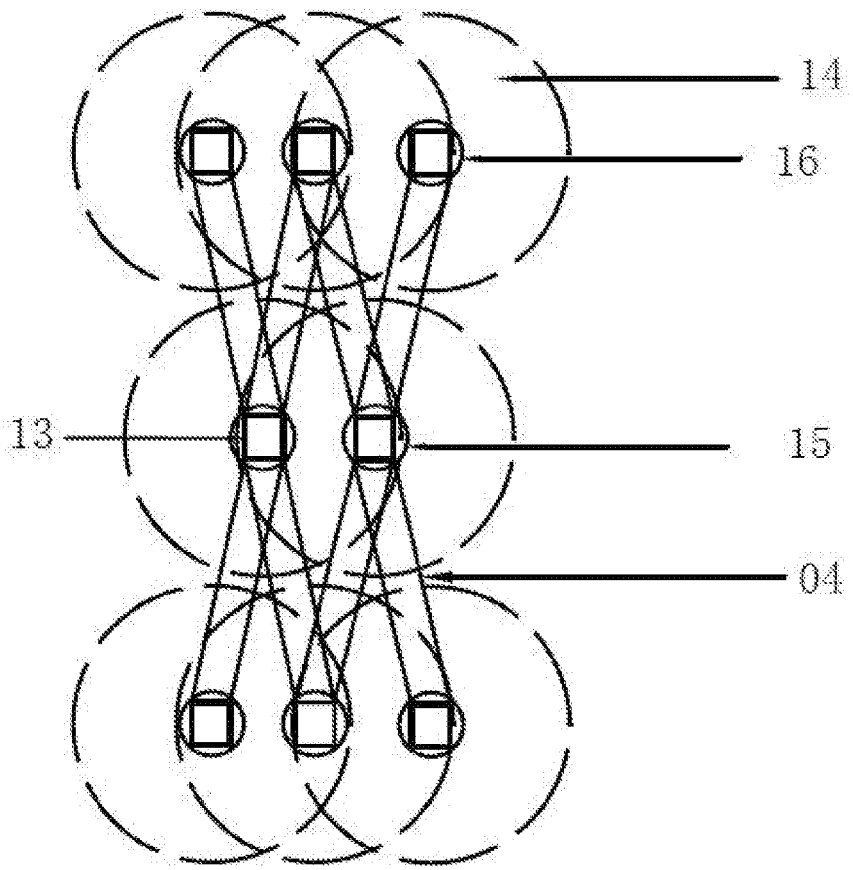
FIG. 17 is a schematic diagram of a preferred collapsible skeleton structure of the aircraft.
Figure 18A:
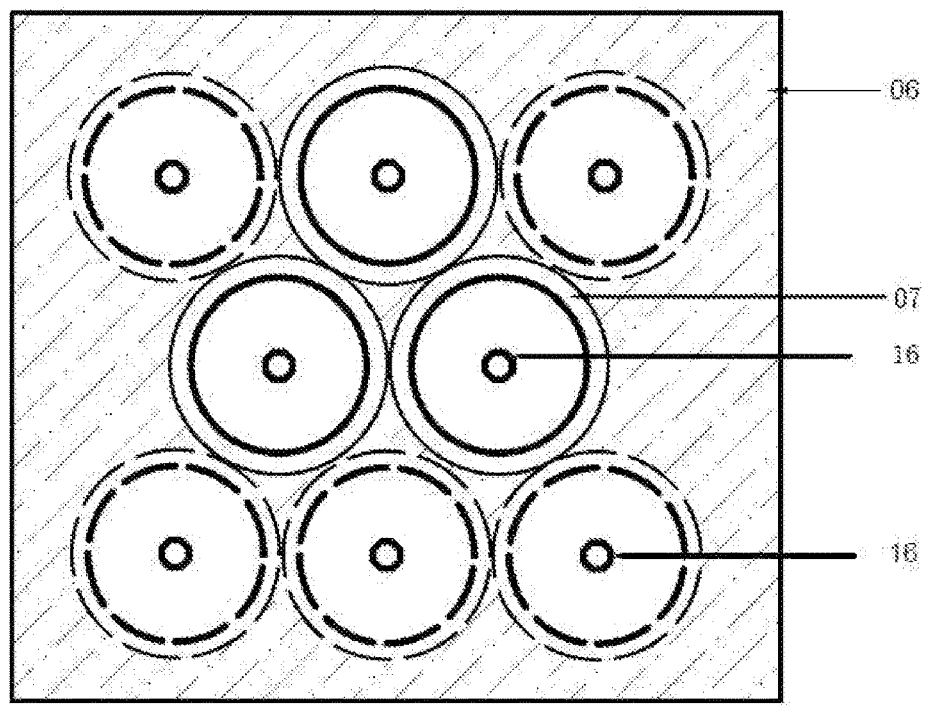
FIG. 18a is a plan view and FIG. 18b is a side view of a schematic diagram of a preferred plane body hollow region installation of the aircraft.
Figure 18B:
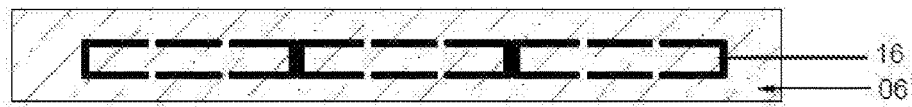

In the above layout, the engines (16) may be connected by a skeleton, a plane body hollow region or through other means. If the engines are connected by means of the skeleton (04), the skeletons are connected by a skeleton connector (13), as shown in FIG. 16, which is a schematic view showing a preferred skeleton connection of the aircraft having eight engines (16). The skeleton connector (13) may achieve a fixed connection or a movable connection. If the fixed skeleton connection is adopted, an integral skeleton (04) can be produced directly, or the skeleton assembly can be fixed by a fixing connector (08). As shown in FIG. 17, the movable skeletons (04) are connected by the movable connector (08), thus forming a collapsible or detachable skeleton (04). In use, the skeleton (04) is restricted from moving by the fixing member so that a stable form is realized. When it is required to reduce the volume of the skeleton in storage and transportation, the fixing member for restricting the moving of the skeleton is released, and the collapsing or detaching of the skeleton (04) is realized. As shown in FIG. 18a, the engines are connected by hollowing a plane body, that is, the engine (16) is mounted in the hollow region (07) inside the plane body (06), as shown in FIG. 18b.

Figure 19A:
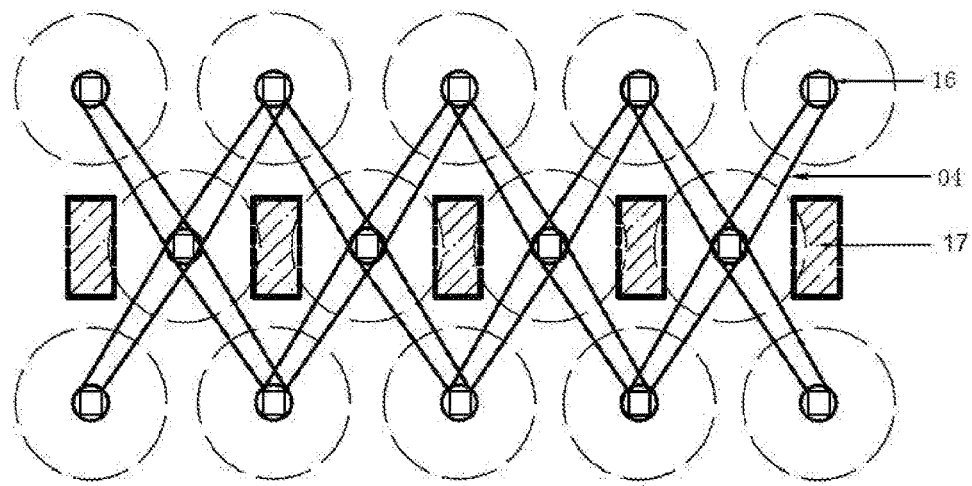
FIG. 19a is a top view and FIG. 19b is a side view of a schematic diagram of an embodiment of the aircraft constructed in accordance with the load form.
Figure 19B:
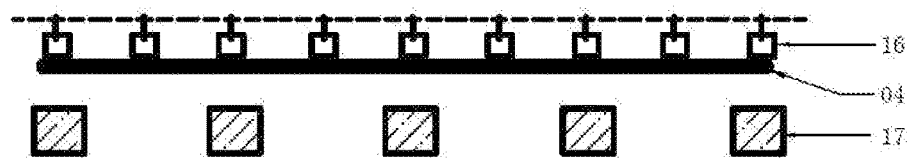
Figure 20A:
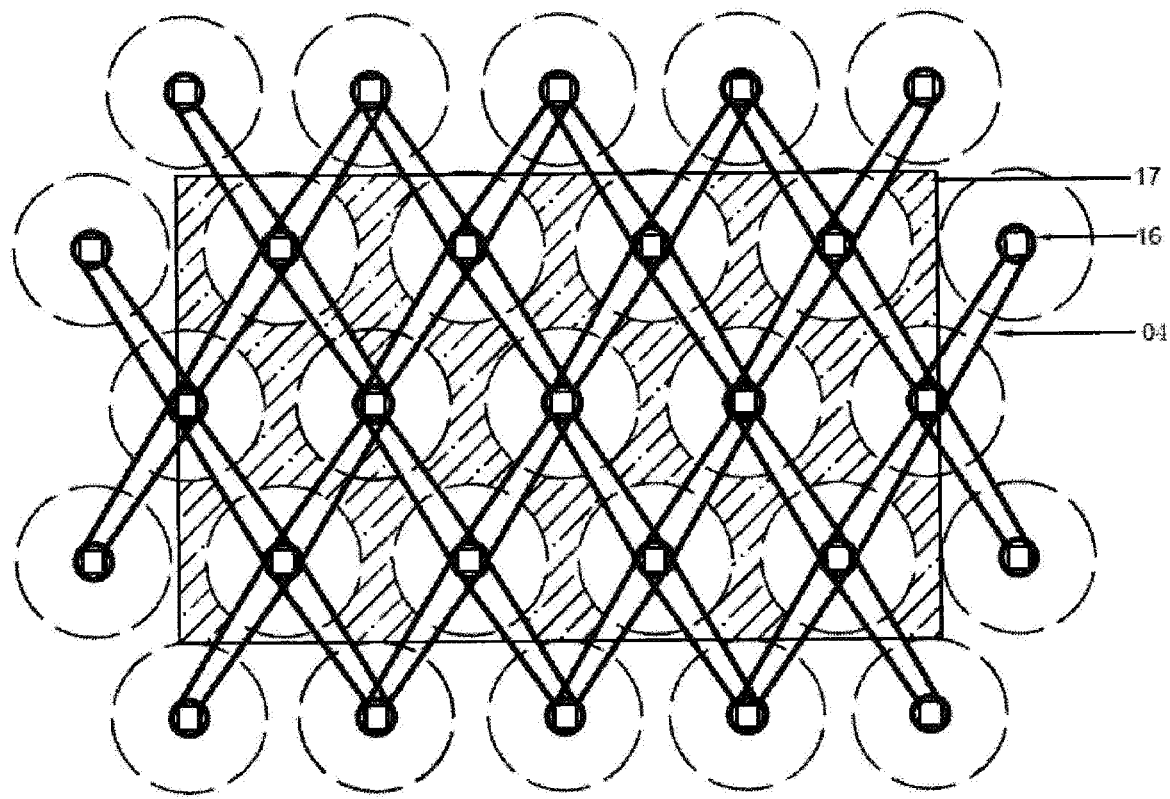
FIG. 20a is a top view and FIG. 20b is a side view of a schematic diagram of another embodiment of the aircraft constructed in accordance with the load form.
Figure 20B:
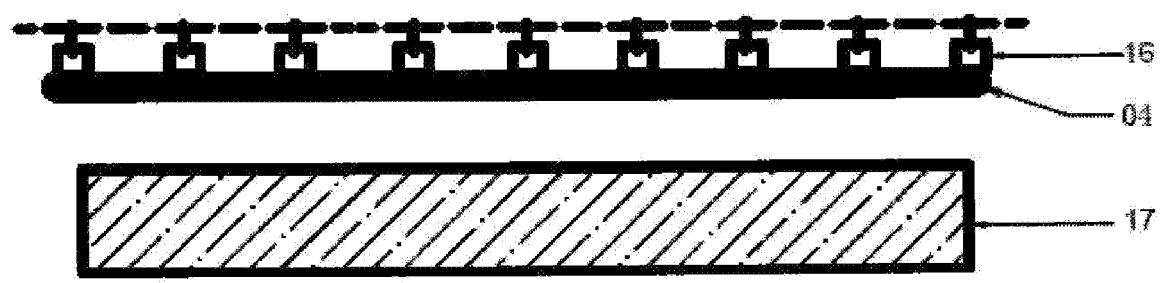

The size and shape of the aircraft of the present invention can be determined according to the form of the load. The regions on the aircraft other than the mounting positions occupied by the drive devices can be used as installation or carrying regions for flight assistance devices or loads. As shown in FIGS. 19 and 20, the engine (16) assembly takes a diamond as a power unit. Each unit may be considered as a module in an aircraft power system. Each module may generate a certain thrust according to the number of the engines (16), and each module can share a part of the load (17) in the aircraft. For example, taking a diamond-shaped module as an example, there are four engines (16) at the four vertices of the diamond. Each engine (16) generates a certain thrust, that is, the module can generate four units of thrust; in the diamond module, there are weights generated by four engines (16) and associated skeletons (04) and batteries, the four units of thrust generated by the module can share the overall weight of the module simultaneously, and meanwhile the residual thrust can be used to share a part of the overall load (17) weight of the aircraft. The power system of the aircraft is constituted by N power modules, and the engine (16) in adjacent power modules is regarded as a shared engine (16) of the modules so that the weight of load (17) that is required to be shared in the adjacent modules are shared together, i.e., the take-off weight of the aircraft is shared by the power system in an approximately uniform manner.

In the aircraft power unit, each power device or each power module may be provided therein with a load (17) carrying region as shown in FIG. 19 or with a region connected to the overall load (17) as shown in FIG. 20. The purpose of such an arrangement is to apply the drive forces generated by the generators (16) in the aircraft power system to the load (17) portions uniformly so that the connection between the engines (16) and the loads (17) of the aircraft will not cause a series of adverse chain reactions which affect the overall flight system due to stress concentration at a certain region.

Figure 21:
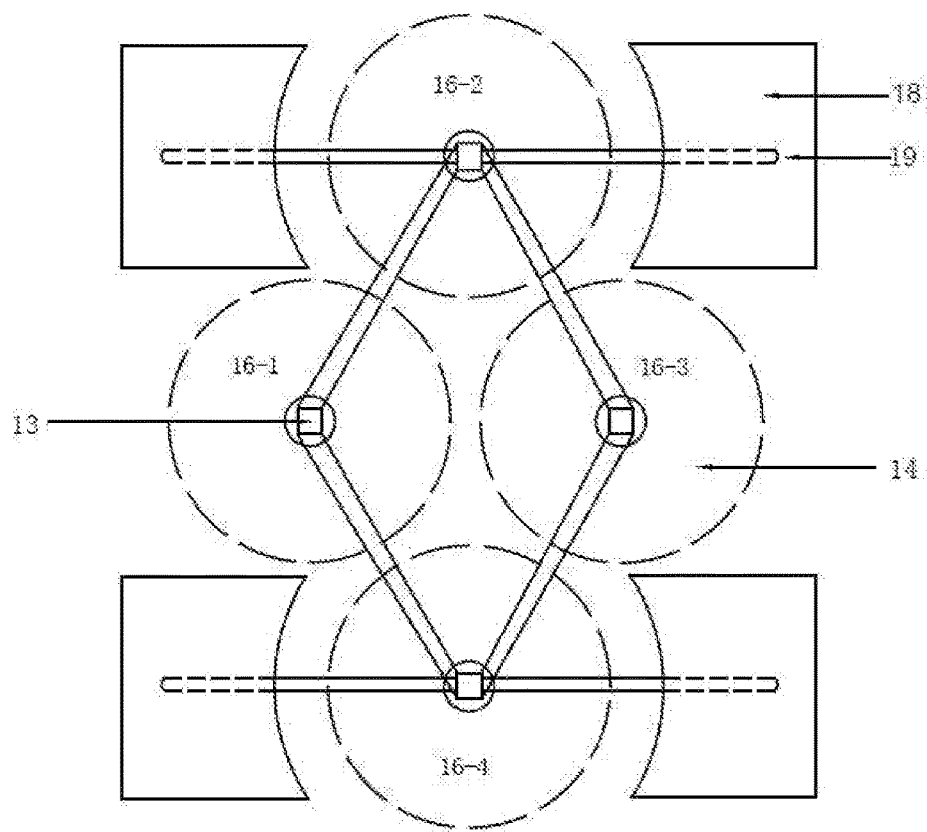
FIG. 21 is a schematic diagram of a preferred layout of the aircraft according to the present invention.

As shown in FIG. 21, in the preferred solution provided by this embodiment, the engines (16-1), (16-2), (16-3) and (16-4) are arranged in a diamond geometric structure, and are connected by skeletons (04); the engines (16) are fixedly mounted to the skeletons (04), and the skeletons (04) are connected by the skeleton connectors (13). The skeleton connectors (13) can achieve a fixed connection or a movable connection. The engines (16) are connected to the propellers (14), and the wings (18) are connected to the aircraft skeletons (04) by wing connectors (19) and are mounted on both sides of the engine (16-2) and the engine (16-4) respectively; the wings (18) can rotate axially.

Figure 22:
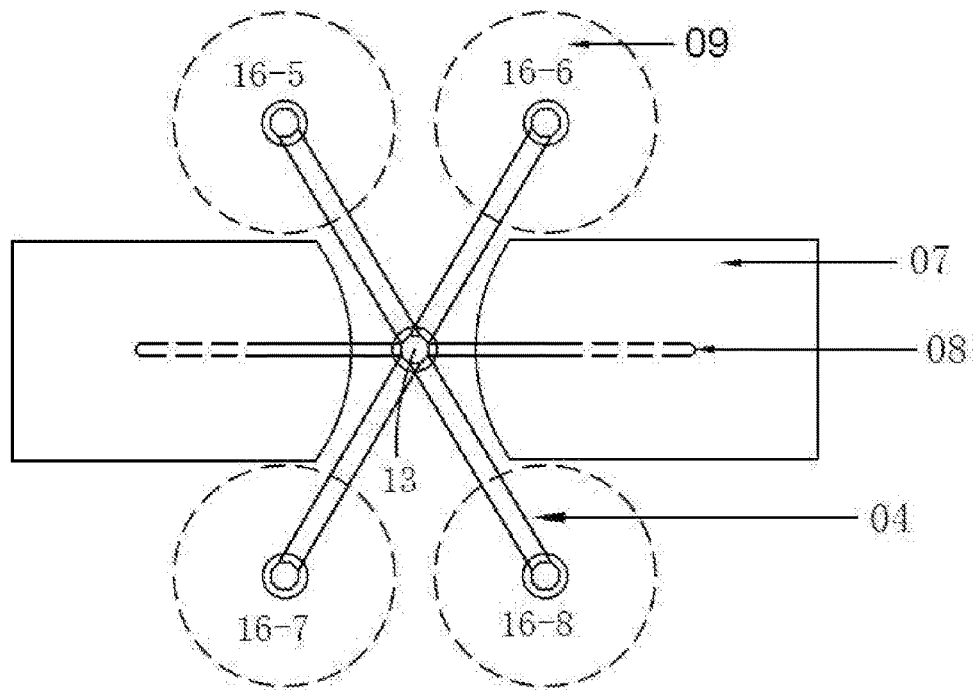
FIG. 22 is a schematic diagram of a layout of the aircraft according to the present invention.

FIG. 22 also shows a feasible embodiment of this solution. The aircraft layout structure in this Figure can be evolved from the geometric method in FIG. 2 or FIG. 3. The engines (16-5), (16-6), (16-7) and (16-8) are arranged in a rectangular shape, and are cross-connected and mounted by the skeletons (04); the connection may be a fixed connection or a movable connection. The engines (16) are connected to the propellers (14), and the wings (18) are mounted on both sides of the skeletons (04) symmetrically; the wings (18) are located between the engines (16-5) and (16-7) as well as between the engines (16-6) and (16-8) respectively, and the wings (18) and the skeletons (04) are connected by the wing connectors (19); the wings (18) can rotate axially.

Figure 23:
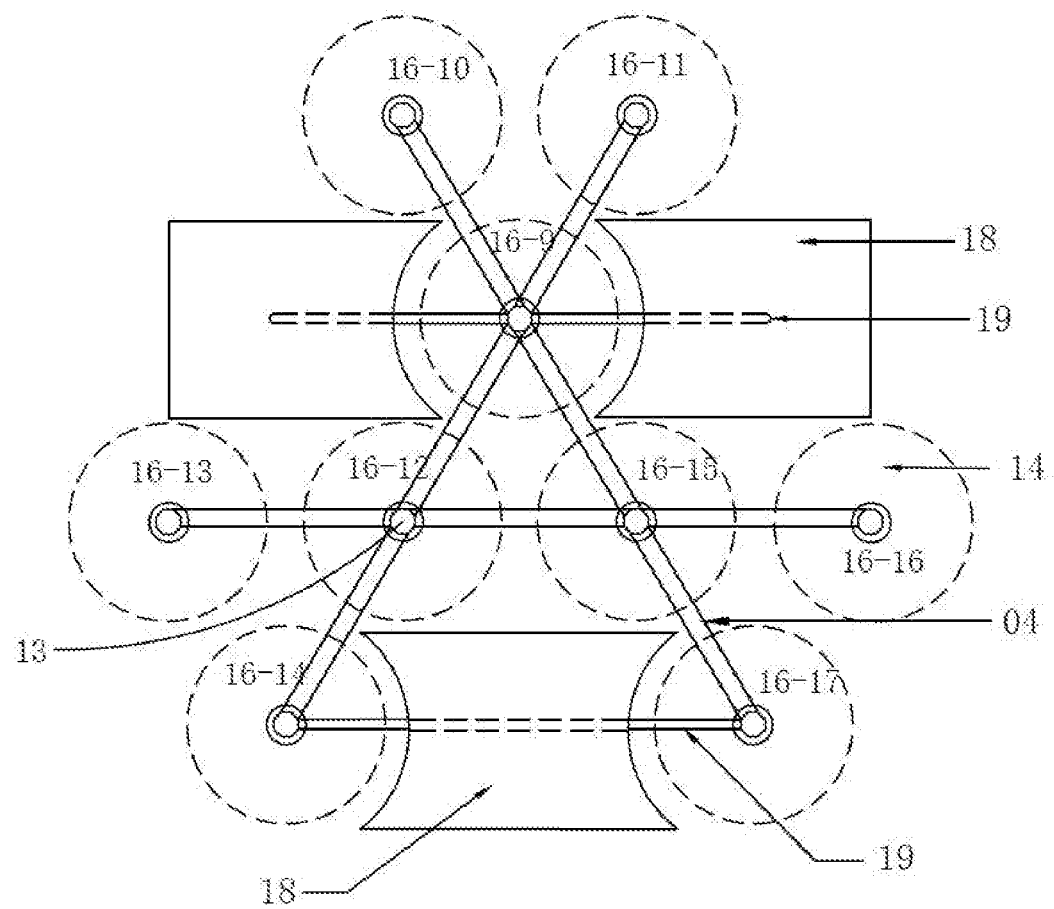
FIG. 23 is a schematic diagram of another layout of the aircraft according to the present invention.
Figure 24A:
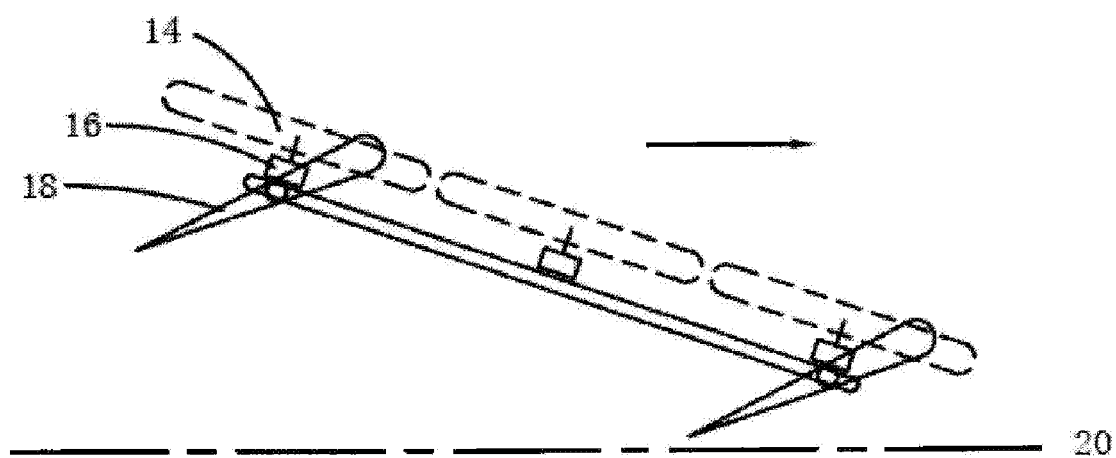
FIGS. 24a, 24b, 24c, 24d, 24e and 24f are side views of a preferred mode of operation of the aircraft according to the present invention, respectively.
Figure 24B:
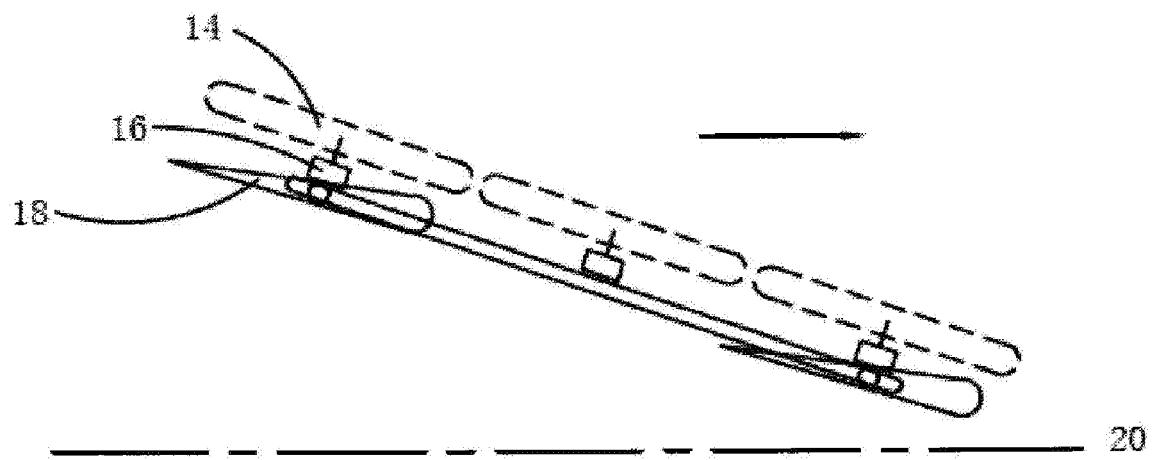
Figure 24C:
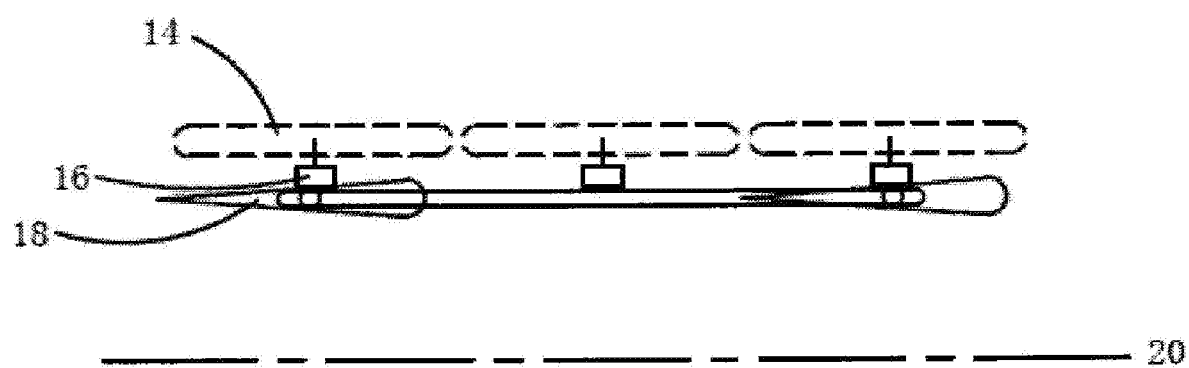
Figure 24D:
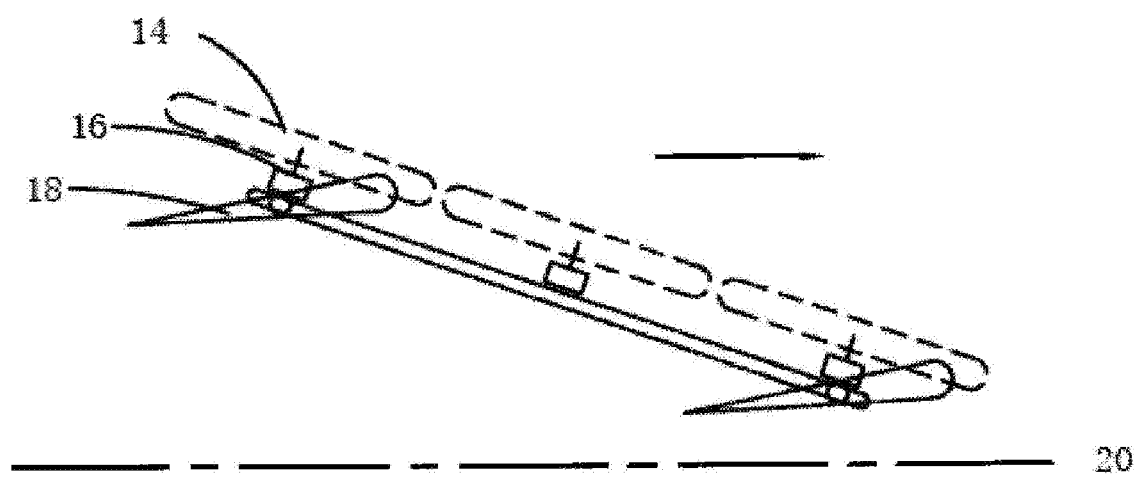
Figure 24E:
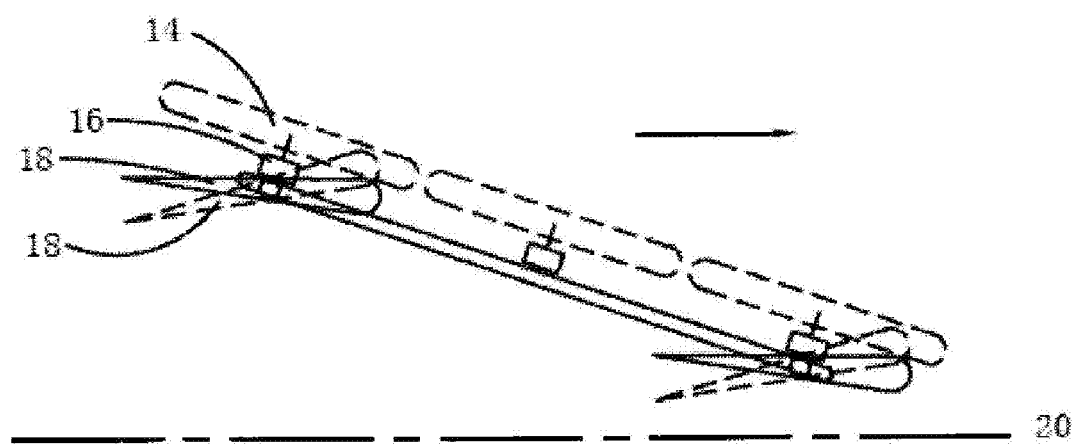
Figure 24F:
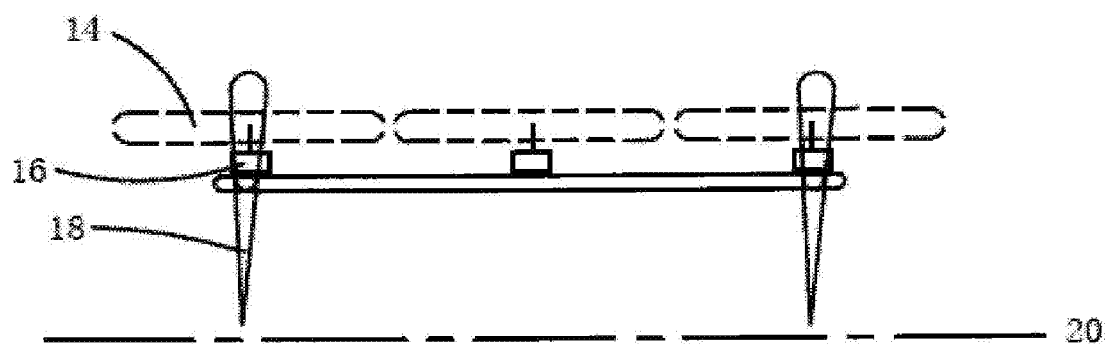

FIG. 23 represents another feasible embodiment of this solution. The layout structure of the aircraft in this Figure can be evolved from the geometric method in FIG. 2 or 3, and is formed by combining three complete triangular drive device modules (01), i.e., the engines (16-9), (16-10) and (16-11) form a triangular drive device module (01), the engines (16-12), (16-13) and (16-14) form a triangular drive device module (01), and the engines (16-15), (16-16) and (16-17) form a triangular drive device module (01). The engines (16) are connected by the skeletons (04), and the connection can be a fixed connection or a movable connection. Each of the engines (16) is connected to a propeller (14), coaxial wings (18) are symmetrically mounted on both sides of the engine (16-9) in the triangular drive device module (01), and another wing (18) is mounted in a region of the triangular drive device module (01) between the engine (16-14) and the engine (16-17); the wings (18) are connected to the skeletons (04) by wing connectors (19), and each of the wings (18) can rotate axially.

In all of the above embodiments, due to the characteristics of the aircraft, the engines (16) can be mounted to the skeletons (04) in an up-down direction, and in case of special requirements, the engines (16) or other devices can be also mounted in other directions.

FIG. 24 of the drawings shows several preferred modes of operation of a type of aircraft of the present invention. As shown in the Figure, (20) represents a horizontal reference line, and the direction of the arrow is the flight direction of the aircraft. FIG. 24a shows an assistant lift and ascending flight modes with the wings (18) tilted upwards simultaneously by a certain angle to generate lift for assisting the engine (16) in providing lift to the aircraft. FIG. 24b shows an assistant descending mode of flight with the wings (18) tilted downwards simultaneously by a certain angle to generate a downward pressing force for promoting the descending of the aircraft, and meanwhile, the coaxial wings (18) in the aircraft can act separately so as to achieve the same effect of changing the pitch angle of the aircraft as an elevator rudder in a fixed wing aircraft. FIG. 24c is a low speed resistance reducing flight mode, in which the wings (18) maintain an approximately parallel relationship with the plane of the engines (16), or keep an optimal angle of wind resistance with respect to the flight direction and the air flow direction, so as to reduce the resistance and maintain the best flight state. FIG. 24d is a cruise flight mode, wherein for achieving that the aircraft has the best performance at different flight speeds, the wing (18) may achieve the best pneumatic layout through adjustment of attack angle, thereby enabling the aircraft to have the best lift-drag ratio at various attitudes and at various flight speeds. FIG. 24e shows a rolling fight mode, in which the rolling torque generated by right-left differential deflections of the coaxial wings (18) (differentially deflected with respect to the flight direction or incident flow direction of the aircraft respectively) allows the aircraft to make a lateral rolling movement. FIG. 24f is a falling or landing mode, that is, when the aircraft is to be landed, the wings (18) reach a certain angle with respect to the fuselage plane and can function as a landing support device, i.e., a landing gear of the aircraft. In this Figure, the wings (18) are approximately perpendicular to the fuselage plane. If it is required to increase the size of the landing gear, a support or shock absorbing assembly may also be added at the position where the wing (18) contacts a landing surface.

FIG. 25a shows a schematic diagram of various modules in the present invention, wherein (21) denotes a drive device module, (22) denotes a connecting module, (23) denotes a load bearing module, and (24) denotes an auxiliary module.

Figure 25B:
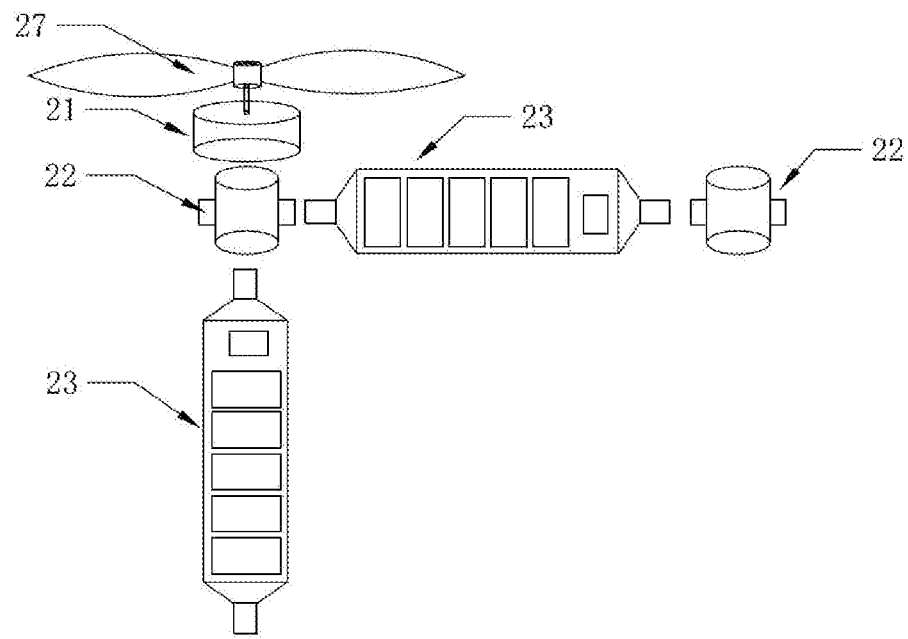
Figure 25C:
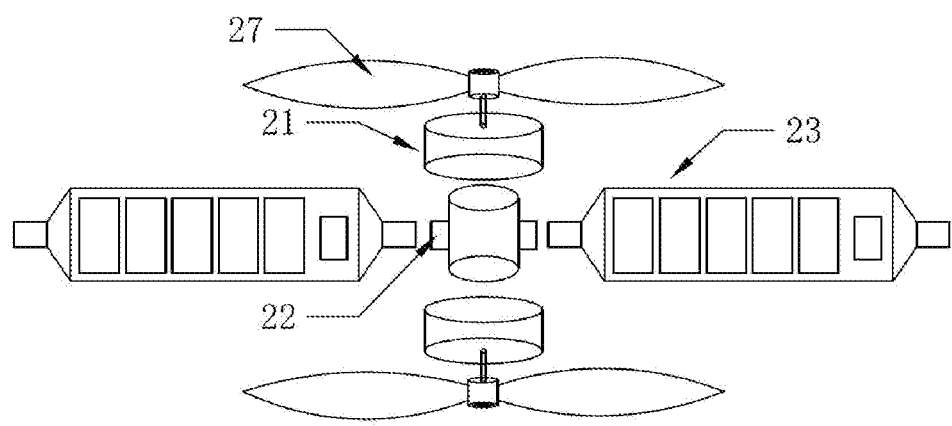
Figure 25D:
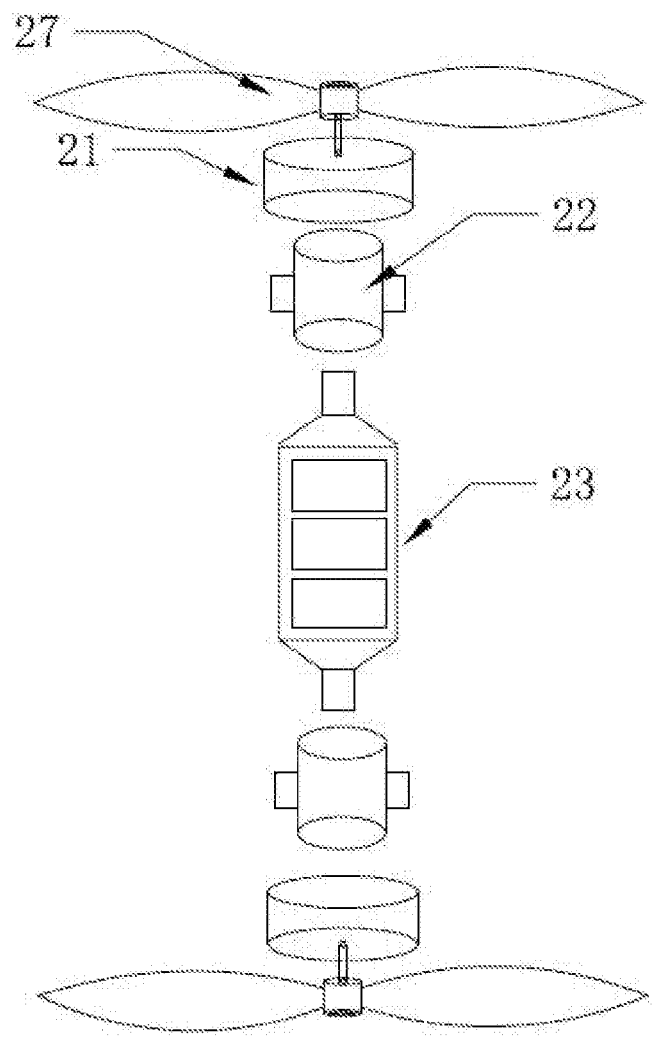
Figure 25E:
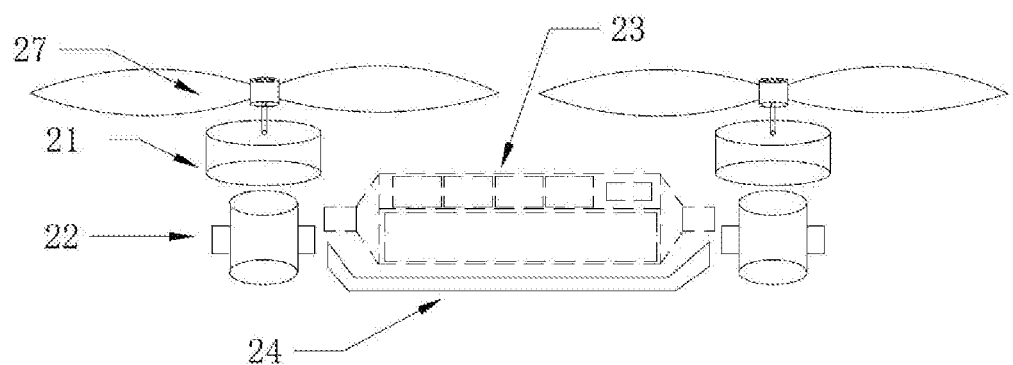
Figure 25F:
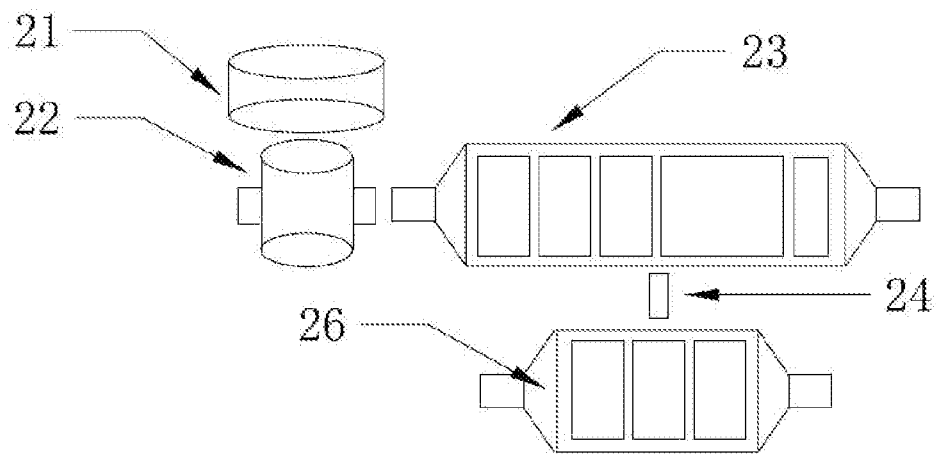

In the following, the structural units of the present invention will be further described in detail. According to the configurations of existing aircrafts, in this embodiment, the energy source is battery and the drive devices are connected to propellers. In FIG. 25b, the drive device module (21) is connected to one end of the load bearing module (23) by the connecting module (22) so as to form a structural unit. The connecting module (22) is also connected to another load bearing module (23) so as to form a structural unit, and in this way, the structural unit can be extended infinitely. In FIG. 25c, two ends of the connecting module (22) in the X-axis direction are each connected to a load bearing module (23), and two ends of the connecting module (22) in the Y-axis direction are each connected to a drive device module (21) so as to form a structural unit; the drive device module (21) is in turn connected to the propeller (27) so as to form an engine power pack; in this way, the engine power pack can be extended infinitely. In FIG. 25d, two ends of the load bearing module (23) are respectively mounted with the drive device modules (21) via the connecting modules (22) so as to form a structural unit, and the drive device modules (21) are connected to propellers (27); in this way, the structural unit can be extended infinitely. In FIG. 25f, two ends of the load bearing module (23) are mounted with the drive device modules (21) via the connecting modules (22), and meanwhile, at the two connecting modules (22), an auxiliary module (24) is provided under the load bearing module (23) so as to form a structural unit together, and each of the drive device modules (21) is connected to a propeller (27). The function of the auxiliary module (24) in this embodiment is to increase the connection strength between the load bearing module (23) and the drive device module (21) in the structural unit when the weight of the load borne by the load bearing module (23) is large. In FIG. 25e, the drive device module (21) is connected to one end of the load bearing module (23) by a connecting module (22) so as to form a structural unit, and the load bearing module (23) may have other loads (26) connected under it via the auxiliary module (24).

For a modular implementation of the aircraft, reference is made to FIGS. 26 to 31.

Figure 26A:
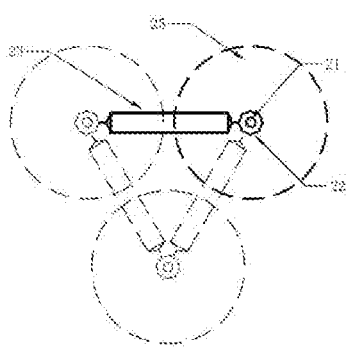
Figure 26B:
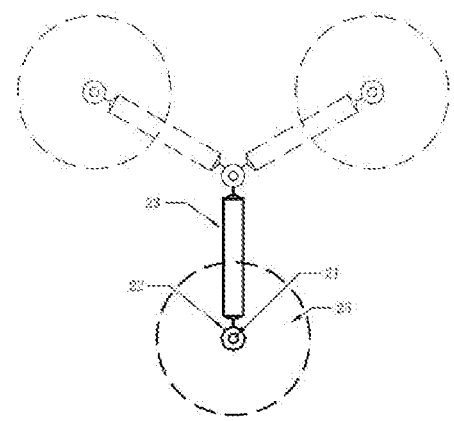
Figure 26C:
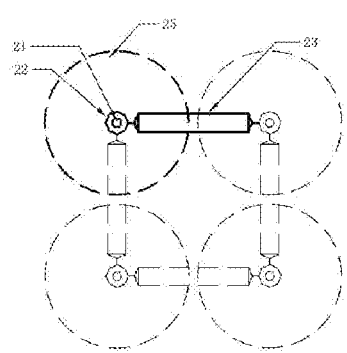
Figure 26D:
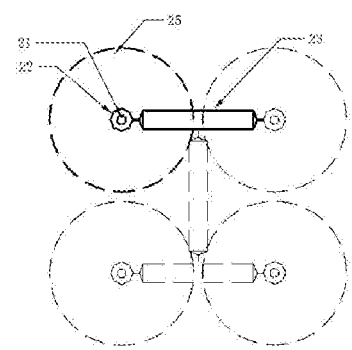
Figure 26E:
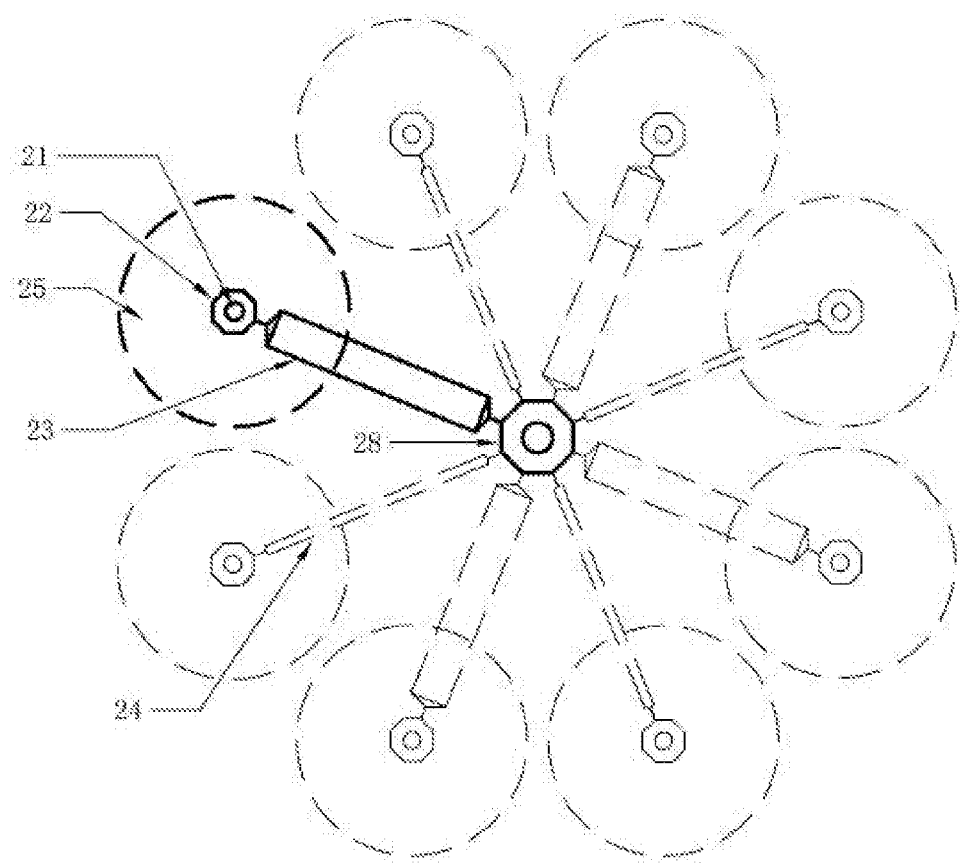

FIGS. 26a, 26b, 26c, 26d and 26e are top views of different embodiments of the modularity of the present invention. In each of the figures, the embodiments are formed by combining in a modularized manner the structural units each formed by connecting the drive device module (21) to one end of the load bearing module (23) by the connecting module (22). In these Figures, (25) is a propeller rotating plane. In FIG. 26e, the drive device module (21) and the load bearing module (23) from a structural unit via the connecting module (22), and the drive device module (21) and the auxiliary module (24) form a structural unit via the connecting modular (22); all of the structural units are sequentially fixed to central connecting module (28) in an annular form so as to form a modular aircraft. This figure illustrates that when the load required by the aircraft is small and it is not necessary for all of the load bearing modules (23) to carry the battery or loads, part of the load bearing modules (23) can be replaced by the auxiliary modules (24) so as to reduce the weight of the aircraft.

As shown in FIG. 27a, the connecting module (22) and the load bearing module (23) form a structural unit, and a plurality of structural units are combined and fixed with the connecting module (22) as a center; drive device modules (21) are mounted to the connecting modules (22) from both above and below, and propellers (27) are mounted to the drive device modules (21).

As shown in FIG. 27b, the drive device module (21), the connecting module (22) and the load bearing module (23) form a structural unit, and N structural units are assembled "end to end" so as to form a modular aircraft having a "looped" structure. Each drive device module (21) is mounted with a propeller (27), and (25) denotes a rotating plane of the propeller.

As shown in FIG. 28a, the drive device module (21), the connecting module (22) and the load bearing module (23) form a structural unit. Four structural units are assembled as a modular aircraft in a diamond configuration, an auxiliary module (24) is mounted under the aircraft for carrying the load. Each of the drive device modules (21) has a propeller (27) mounted thereto, and (25) denotes a propeller rotating plane. FIG. 28b is a partial side view, and other loads (26) are carried under the auxiliary module (24).

Each of FIGS. 29, 30 and 31 is a schematic diagram of an extended embodiment of the modularity of the aircraft of the present invention. FIG. 29 is a schematic diagram of an unlimited extension of FIG. 28a, FIG. 30 is a schematic diagram of an unlimited extension of FIG. 26e, and FIG. 31 is a schematic diagram of an unlimited extension of FIG. 26c.

It must be pointed out that in addition to the above embodiments, the present invention of course can have many other embodiments; for example, the drive device module may also be embodied as a fuel-powered engine or engine driven by other energies; equivalent changes and modifications made according to the present invention also fall within the scope of the present invention, and therefore should be regarded as further embodiments of the present invention. For example, due to the structural and functional characteristics of the aircraft, some drive devices do not have to be assembled strictly in accordance with the equilateral triangle module, but may be assembled in an isosceles triangle arrangement layout. Similarly, some drive devices also do not have to be assembled strictly in accordance with the diamond module, but may be assembled in a parallelogram layout, and so on. In addition, installation positions of the wings in the aircraft structure of the present invention are also selected as permitted by technical conditions. It can be seen that all the relevant equivalent technical solutions should fall within the scope of protection as claimed by the present invention.

The figures are only schematic and not drawn to scale. While the present invention has been described in connection with the preferred embodiments, it should be understood that the scope of the present invention is not limited to the embodiments described herein.

In conjunction with the description and practice of the present invention disclosed herein, other embodiments of the present invention will be readily envisaged and understood by those skilled in the art. It is intended that the description and embodiments are considered as exemplary only, and a true scope and spirit of the present invention are both defined by the appended claims.

What is claimed is:

1. An aircraft comprising:
   a plurality of rotors;
   a plurality of movable connectors, each of the plurality of rotors coupled to at least one other of the plurality of rotors by one of the plurality of movable connectors to form a movable skeleton of the aircraft,
   wherein the movable skeleton is configured to collapse through movement of the movable connectors and the plurality of rotors are distributed as follows:
      three of the rotors form a triangular unit by way of at least two of the plurality of movable connectors, the three rotors are located at vertices of the triangular unit, and other rotors are distributed outside the triangular unit and at intersection points of three groups of parallel lines,
   wherein each group of parallel lines comprise an equidistant line in parallel with a side of the triangular unit and a line where the side is located, spacing of each group of parallel lines is a height length of a corresponding side of the triangular unit and a number of the rotors is greater than or equal to 3, 4, 5, 6, 7, 8, 9, 10, 15, 24 or 30; and
   a plurality of wings, each of the plurality of wings rotatably connected to the movable skeleton of the aircraft through one or more of the movable connectors, the plurality of wings distributed across the movable skeleton and configured to be rotated to adjust an angle of attack during flight of the aircraft such that the plurality of wings result in pitch and roll forces being applied to the aircraft during flight of the aircraft based on the rotation of the plurality of wings, wherein one or more of the wings is additionally configured to a second state to serve as a landing support device for the aircraft.

2. The aircraft according to claim 1, wherein the plurality of rotors are powered by one or more batteries and/or engine.

3. The aircraft according to claim 1, wherein the aircraft is assembled in a form of module groups, and the module groups comprises: a rotor unit; a connecting cabin unit; and an auxiliary unit.

4. The aircraft according to claim 1, further comprising a fuselage for carrying a load.

5. The aircraft according to claim 4, wherein the aircraft is assembled in a form of module groups, and the module groups comprises: a rotor unit; a connecting cabin unit; and an auxiliary unit.

6. The aircraft according to claim 1, wherein the triangular unit is an equilateral triangle.

7. The aircraft according to claim 6, wherein the plurality of rotors are distributed to form the triangular unit,
   the triangular unit and one or more additional triangular units are mapped and arranged towards a spatial direction so as to be combined such that the aircraft is constituted by multiple rotors, and
   the number of the rotors in the aircraft is N, wherein N≥3.

8. The aircraft according to claim 7, wherein the plurality of rotors include:
   the three of the rotors that form the triangular unit, with vertices A, B, and C, the triangular unit being a first triangular unit and being arranged as an equilateral triangle,
   a side BC of the triangular unit that includes vertices B and C are part of a second triangular unit with the vertices B, C, and vertex D, the second triangular unit arranged as an equilateral triangle, the first triangular unit and the second triangular unit forming a first diamond unit that includes the three of the rotors and a fourth rotor,
   wherein the aircraft further includes a second diamond unit configured in the same manner as the first diamond unit, the second diamond unit sharing one or more vertices with the first diamond unit such that the second diamond unit also includes one or more of the three of the rotors and the fourth rotor.

* * * * *